(12) United States Patent
Baez et al.

(10) Patent No.: US 11,617,064 B2
(45) Date of Patent: *Mar. 28, 2023

(54) DIFFERENTIATED PRIVACY PERMISSIONS FOR MANAGEMENT OF COMMUNICATION PRIVILEGES

(71) Applicant: Slack Technologies, Inc., San Francisco, CA (US)

(72) Inventors: Max Baez, San Francisco, CA (US); Colin Gibbs, San Francisco, CA (US); Alan Hardin, San Francisco, CA (US); Jennifer Enrique, San Francisco, CA (US); Kevin Marshall, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 17/146,941

(22) Filed: Jan. 12, 2021

(65) Prior Publication Data
US 2021/0243572 A1    Aug. 5, 2021

Related U.S. Application Data

(63) Continuation of application No. 16/777,588, filed on Jan. 30, 2020, now Pat. No. 11,272,326.

(51) Int. Cl.
*H04L 29/08*    (2006.01)
*H04W 4/08*    (2009.01)
(Continued)

(52) U.S. Cl.
CPC ............ *H04W 4/08* (2013.01); *H04L 12/189* (2013.01); *H04L 51/216* (2022.05); *H04L 51/56* (2022.05); *H04W 8/186* (2013.01); *H04W 76/11* (2018.02)

(58) Field of Classification Search
None
See application file for complete search history.

(56) References Cited

U.S. PATENT DOCUMENTS

| | | |
|---|---|---|
| 8,490,163 B1 | 7/2013 | Harsell et al. |
| 8,819,851 B1 | 8/2014 | Johansson |
| | (Continued) | |

FOREIGN PATENT DOCUMENTS

JP        2022522916 A        4/2022

OTHER PUBLICATIONS

European Office Action dated Aug. 19, 2021 for European Application No. 20811932.1, a foreign counterpart to U.S. Appl. No. 16/777,588, 10 pages.

(Continued)

*Primary Examiner* — Sithu Ko
(74) *Attorney, Agent, or Firm* — Lee & Hayes, P.C.

(57) ABSTRACT

Implementing communication barriers in a group-based communication system is described. In an example, a privacy setting associated with a communication privilege for communicating with a user of a group-based communication system can be stored, wherein the privacy setting permits the user to transmit communications via the group-based communication and restricts another user of the group-based communication system from communicating with the user. The group-based communication system can deny a communication privilege of the other user based at least in part on the privacy setting, wherein denying the communication privilege prohibits the other user from at least one of initiating a message associated with a user identifier of the user or transmitting the message to a client device associated with the user identifier.

20 Claims, 12 Drawing Sheets

(51) Int. Cl.
  *H04W 76/11*  (2018.01)
  *H04L 12/18*  (2006.01)
  *H04W 8/18*  (2009.01)
  *H04L 51/56*  (2022.01)
  *H04L 51/216*  (2022.01)

(56) References Cited

U.S. PATENT DOCUMENTS

| | | | |
|---|---|---|---|
| 9,396,351 | B2 | 7/2016 | Lim |
| 9,992,620 | B2* | 6/2018 | Curry .................. H04W 4/022 |
| 10,021,059 | B1* | 7/2018 | Rao .................... H04L 63/0428 |
| 10,162,968 | B1 | 12/2018 | Kumar et al. |
| 10,193,775 | B2 | 1/2019 | Fletcher et al. |
| 10,209,956 | B2 | 2/2019 | Fletcher et al. |
| 10,229,205 | B1* | 3/2019 | Grant .................... G06F 16/951 |
| 10,331,303 | B1 | 6/2019 | Gurtin et al. |
| 10,346,378 | B1 | 7/2019 | Jones et al. |
| 10,348,731 | B2* | 7/2019 | Jayaram ................. H04W 4/12 |
| 10,390,287 | B2* | 8/2019 | Nishimura ............ H04W 48/02 |
| 10,397,391 | B1* | 8/2019 | Czajka ............... H04M 1/72484 |
| 2011/0145292 | A1 | 6/2011 | Lillie et al. |
| 2012/0158787 | A1* | 6/2012 | Hu ........................ H04L 63/104 |
| | | | 707/E17.001 |
| 2015/0178295 | A1* | 6/2015 | Lim ...................... H04L 63/205 |
| | | | 726/1 |
| 2017/0006522 | A1 | 1/2017 | Nishimura et al. |
| 2017/0331828 | A1* | 11/2017 | Caldera ............... H04L 63/0807 |
| 2018/0197144 | A1* | 7/2018 | Frank .................... H04L 63/104 |
| 2018/0278557 | A1* | 9/2018 | Robbins .................. H04L 51/02 |
| 2018/0287982 | A1 | 10/2018 | Draeger et al. |
| 2019/0190863 | A1* | 6/2019 | Baker .................... H04L 63/104 |
| 2019/0356627 | A1* | 11/2019 | Wolfe .................... H04L 51/52 |
| 2021/0243569 | A1 | 8/2021 | Baez et al. |

OTHER PUBLICATIONS

Office Action for U.S. Appl. No. 16/777,588, dated Jul. 30, 2021, Baez, "Methods, Apparatuses and Computer Program Products for Implementing Communication Barriers in a Group-Based Communication System" 13 pages.

The PCT Search Report and Written Opinion dated Jan. 29, 2021 for PCT application No. PCT/US20/53732, 15 pages.

European Office Action dated Feb. 22, 2022 for European Patent Application No. 20811932.1, a foreign counterpart to U.S. Pat. No. 11,272,326, 10 pages.

Arbuthnot, Tom, "Information Barriers (Ethical Wallsor Chinese Walls) in Preview in Microsoft Teams", available online at <<https://tomtalks.blog/2019/05/information-barriers-ethical-walls-or-chinese-walls-in-preview-in-microsoft-teams/>, May 5, 2019, 10 pages.

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

Michael Carney, "Slack is thriving on a cocktail of whimsy and great timing", Pandodaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut Us All Some Slack", Readwriteweb, LexisNexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, LexisNexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (BITS), LexisNexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Microsoft, "Information barriers in Microsoft Teams", available online at <https://docs.microsoft.com/en-us/microsoftteams/information-barriers-in-teams>, Nov. 18, 2019, 6 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, LexisNexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 3 pages.

Japanese Office Action dated May 31, 2022 for Japanese Patent Application No. 2021-516800, a foreign counterpart to U.S. Pat. No. 11,272,326, 11 pages.

\* cited by examiner

DIFFERENTIATED PRIVACY PERMISSIONS FOR MANAGEMENT OF COMMUNICATION PRIVILEGES

RELATED APPLICATIONS

This application claims priority to and is a continuation of U.S. patent application Ser. No. 16/777,588, filed on Jan. 30, 2020, the entire contents of which are incorporated herein by reference.

BACKGROUND

Applicant has identified many deficiencies and problems associated with communication separation in computer systems. For example, many methods, apparatus, and systems fail to provide communication barriers between users in a communication system.

BRIEF SUMMARY

In general, embodiments of the present disclosure provide methods, apparatus, systems, computing devices, and/or the like for implementing communication barrier in a group-based communication system.

In accordance with various embodiments of the present disclosure, an apparatus for implementing at least one communication barrier in a group-based communication platform may be provided. The apparatus may comprise at least one processor and at least one non-transitory memory comprising a computer program code. The at least one non-transitory memory and the computer program code may be configured to, with the at least one processor, cause the apparatus to: receive a first group correlation between a first user identifier and a first group identifier, wherein the first user identifier may be associated with a first workspace identifier and a first group-based communication channel, wherein the first group-based communication channel may be associated with the first workspace identifier and a second workspace identifier; receive a second group correlation between a second user identifier and a second group identifier, wherein the second user identifier may be associated with the second workspace identifier and the first group-based communication channel; retrieve a communication separation settings set associated with the first group identifier and the second group identifier, wherein the communication separation settings set indicates the at least one communication barrier between the first group identifier and the second group identifier; and cause rendering, on a group-based communication interface, a first electronic indication associated with the first group-based communication channel based at least in part on the at least one communication barrier.

In some examples, the first electronic indication may indicate a recommended disassociation between the first group-based communication channel and the second workspace identifier.

In some examples, the first electronic indication may comprise an archived copy of messaging communications associated with the first group-based communication channel.

In some examples, the communication separation settings set may further indicate a plurality of communication barriers between the first group identifier and a plurality of group identifiers associated with the group-based communication platform.

In some examples, the at least one non-transitory memory and the program code may be configured to, with the at least one processor, cause the apparatus to further: receive a third group correlation between a third user identifier and the second group identifier, wherein the third user identifier may be associated with the first workspace identifier; and cause rendering, on the group-based communication interface, a second electronic indication associated with the third user identifier based at least in part on the at least one communication barrier between the first group identifier and the second group identifier.

In some examples, the second electronic indication may comprise a messaging communication indicating a recommended disassociation between the third user identifier and the first workspace identifier.

In some examples, the second electronic indication may comprise a messaging communication indicating a recommended association between the third user identifier and the second workspace identifier.

In some examples, the at least one non-transitory memory and the program code may be configured to, with the at least one processor, cause the apparatus to further: retrieve a direct message settings set related to a plurality of direct messages associated with the first user identifier and the second user identifier; and based at least in part on the at least one communication barrier between the first group identifier and the second group identifier, cause the direct message settings set to indicate that the plurality of direct messages may be read-only.

In some examples, the at least one non-transitory memory and the program code may be configured to, with the at least one processor, cause the apparatus to further: cause rendering, on the group-based communication interface, a second electronic indication indicating a recommended disassociation between the second user identifier and the direct message settings set.

In some examples, the at least one non-transitory memory and the program code may be configured to, with the at least one processor, cause the apparatus to further: retrieve a multi-party direct message settings set related to a plurality of multi-party direct messages associated with the first user identifier, the second user identifier, and a third user identifier; and based at least in part on the at least one communication barrier, cause the multi-party direct message settings set to indicate that the plurality of multi-party direct messages may be read-only.

In some examples, the at least one non-transitory memory and the program code may be configured to, with the at least one processor, cause the apparatus to further: cause rendering, on the group-based communication interface, a second electronic indication indicating a recommended disassociation between the second user identifier and the multi-party direct message settings set.

In some examples, the at least one non-transitory memory and the program code may be configured to, with the at least one processor, cause the apparatus to further: retrieve, from a group-based communication repository, a plurality of messaging communications associated with the first user identifier; generate a recommended group correlation for the first user identifier based at least in part on the plurality of messaging communications and a machine learning model; and cause rendering, on the group-based communication interface, an electronic indication indicating the recommended group correlation.

In some examples, the at least one non-transitory memory and the program code may be configured to, with the at least one processor, cause the apparatus to further: receive a user input in response to the electronic indication indicating the recommended group correlation; and update the machine learning model based at least in part on the user input.

In some examples, the at least one non-transitory memory and the program code may be configured to, with the at least one processor, cause the apparatus to further: receive a group-based communication channel join request associated with the first user identifier and a second group-based communication channel; and based at least in part on determining that the second user identifier may be associated with the second group-based communication channel, cause rendering, on the group-based communication interface, a second electronic indication based at least in part on the at least one communication barrier. In some examples, the second group-based communication channel may be an announcement channel.

In some examples, the at least one non-transitory memory and the program code may be configured to, with the at least one processor, cause the apparatus to further: receive a group-based communication channel view request associated with the first user identifier and a second group-based communication channel; and based at least in part on determining that the second user identifier may be associated with the second group-based communication channel, cause rendering, on the group-based communication interface, a second electronic indication based at least in part on the at least one communication barrier. In some examples, the second group-based communication channel may be an announcement channel.

In some examples, the at least one non-transitory memory and the program code may be configured to, with the at least one processor, cause the apparatus to further: receive a messaging communication search request comprising a search string from a user device associated with the first group identifier; generate a retrieved messaging communication set comprising a plurality of messaging communications based at least in part on the search string; based at least in part on the at least one communication barrier between the first group identifier and the second group identifier, remove at least one messaging communication associated with the second group identifier from the plurality of messaging communications in the retrieved messaging communication set; and subsequent to removing the at least one messaging communication, cause rendering, in the group-based communication interface, the retrieved messaging communication set.

In some examples, the at least one non-transitory memory and the program code may be configured to, with the at least one processor, cause the apparatus to further: receive a user profile search request comprising a search string from a user device associated with the first group identifier; generate a retrieved user profile set comprising a plurality of user profiles based at least in part on the search string; based at least in part on the at least one communication barrier between the first group identifier and the second group identifier, remove at least one user profile associated with the second group identifier from the plurality of user profiles in the retrieved user profile set; and subsequent to removing the at least one user profile, cause rendering, in the group-based communication interface, the retrieved user profile set.

In some examples, the communication separation settings set further may indicate that the first user identifier may be associated with a privacy privilege setting.

In some examples, the at least one non-transitory memory and the program code may be configured to, with the at least one processor, cause the apparatus to further: receive a messaging communication from a second client device associated with the second workspace identifier for a first client device associated with the first user identifier; retrieve the privacy privilege setting, wherein the privacy privilege setting comprises a messaging communication protocol associated with the first workspace identifier and the second workspace identifier; and cause rendering, on the group-based communication interface, a second electronic indication based at least in part on the messaging communication protocol.

In some examples, the messaging communication protocol comprises a list of approved workspace identifiers.

In some examples, the second electronic indication indicates that the messaging communication may be not in compliance with the messaging communication protocol.

In some examples, the second electronic indication comprises a messaging communication request to the first client device.

In accordance with various embodiments of the present disclosure, a computer-implemented method for implementing at least one communication barrier in a group-based communication platform may be provided. The computer-implemented method may comprise receiving a first group correlation between a first user identifier and a first group identifier, wherein the first user identifier may be associated with a first workspace identifier and a first group-based communication channel, wherein the first group-based communication channel may be associated with the first workspace identifier and a second workspace identifier; receiving a second group correlation between a second user identifier and a second group identifier, wherein the second user identifier may be associated with the second workspace identifier and the first group-based communication channel; retrieving a communication separation settings set associated with the first group identifier and the second group identifier, wherein the communication separation settings set indicates the at least one communication barrier between the first group identifier and the second group identifier; and causing rendering, on a group-based communication interface, a first electronic indication associated with the first group-based communication channel based at least in part on the at least one communication barrier.

In accordance with various embodiments of the present disclosure, a computer program product may be provided. The computer program product may comprise at least one non-transitory computer-readable storage medium having computer-readable program code portions stored therein. The computer-readable program code portions may comprise an executable portion configured to: receive a first group correlation between a first user identifier and a first group identifier, wherein the first user identifier may be associated with a first workspace identifier and a first group-based communication channel, wherein the first group-based communication channel may be associated with the first workspace identifier and a second workspace identifier; receive a second group correlation between a second user identifier and a second group identifier, wherein the second user identifier may be associated with the second workspace identifier and the first group-based communication channel; retrieve a communication separation settings set associated with the first group identifier and the second group identifier, wherein the communication separation settings set indicates the at least one communication barrier between the first group identifier and the second group identifier; and cause rendering, on a group-based communication interface, a first electronic indication associated with the first group-based communication channel based at least in part on the at least one communication barrier.

The above summary is provided merely for the purpose of summarizing some example embodiments to provide a basic understanding of some aspects of the disclosure. Accordingly, it will be appreciated that the above-described embodiments are merely examples and should not be construed to narrow the scope or spirit of the disclosure. It will be appreciated that the scope of the disclosure encompasses many potential embodiments in addition to those here summarized, some of which will be further described below.

BRIEF DESCRIPTION OF THE DRAWINGS

Figure 1:
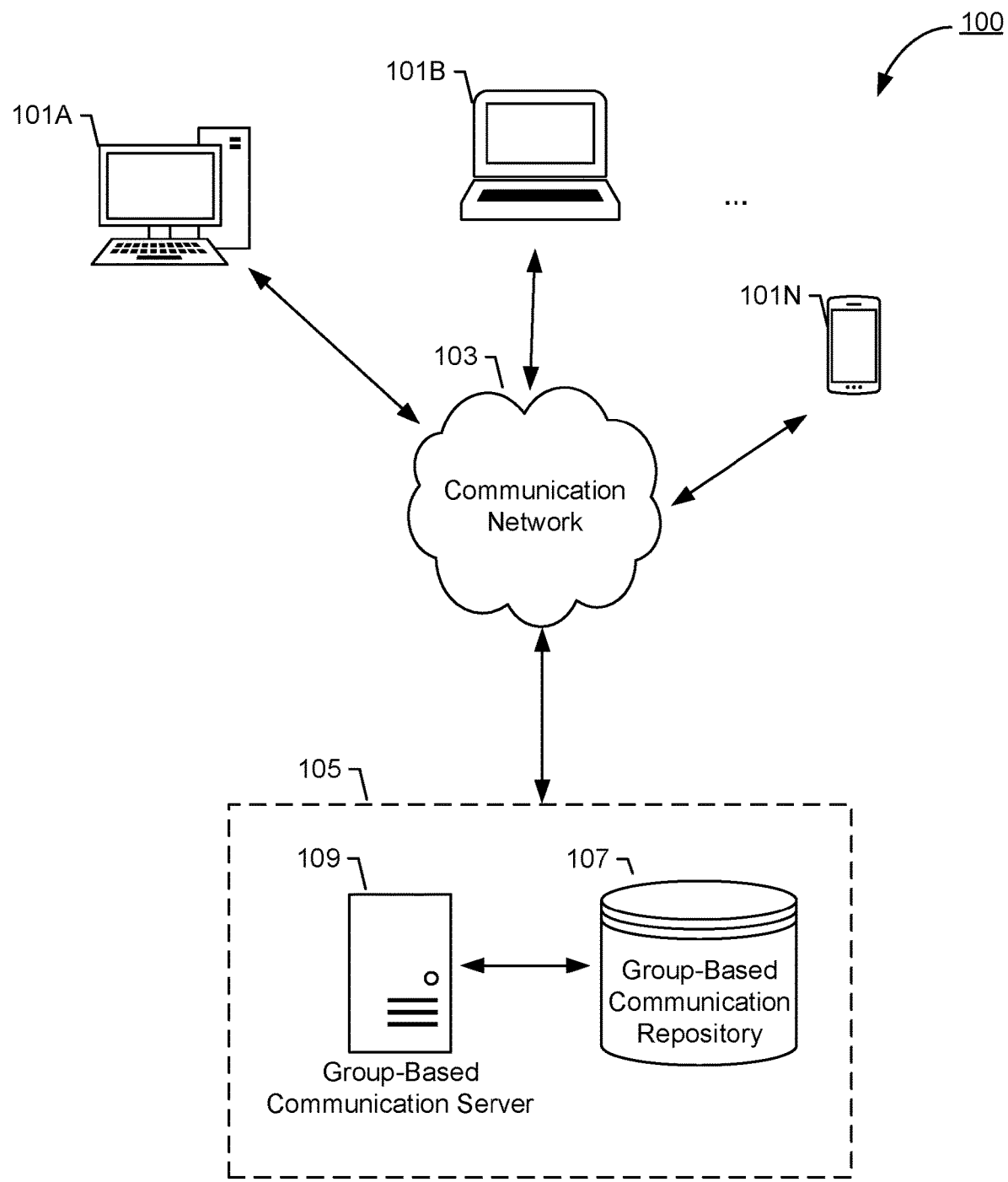
Figure 2:
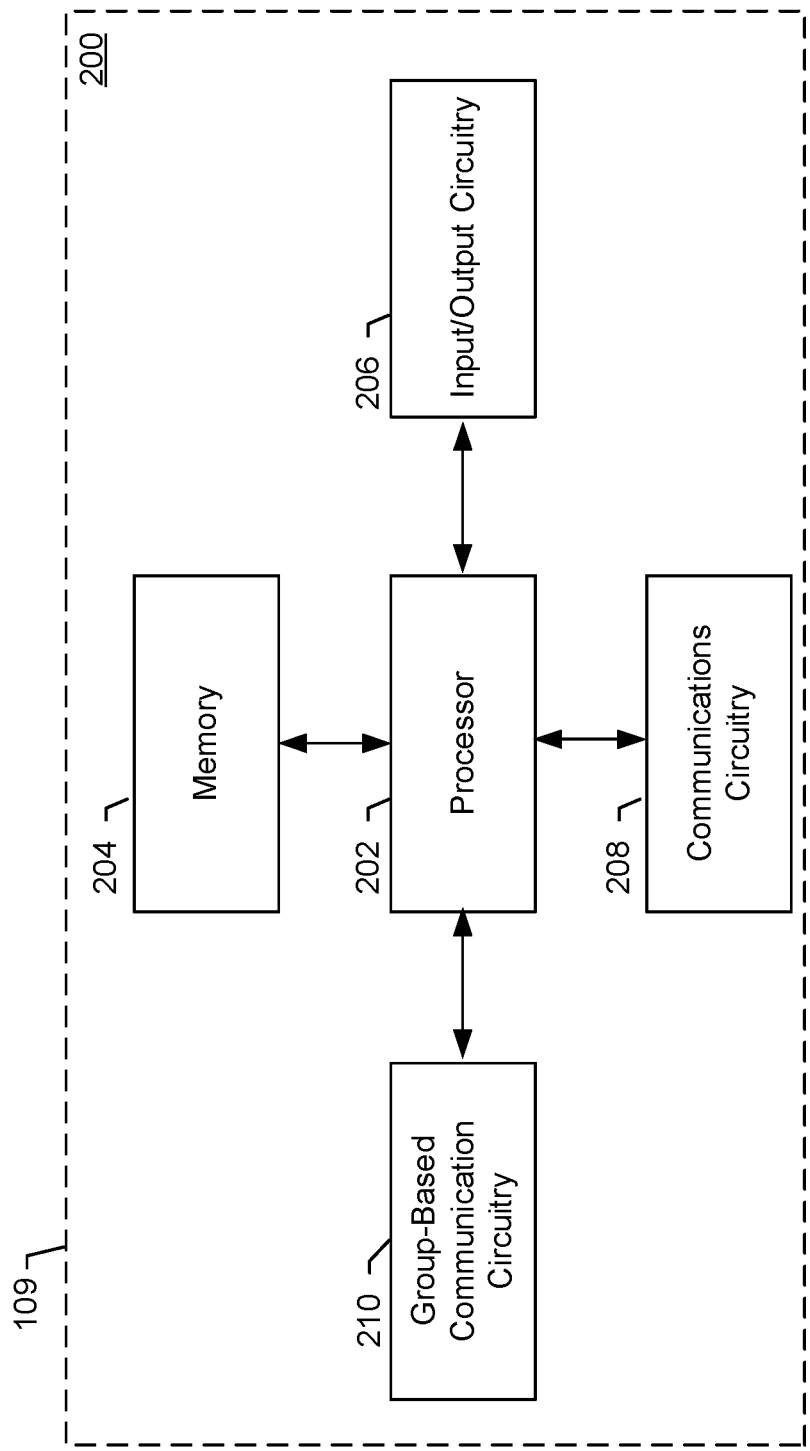
Figure 3:
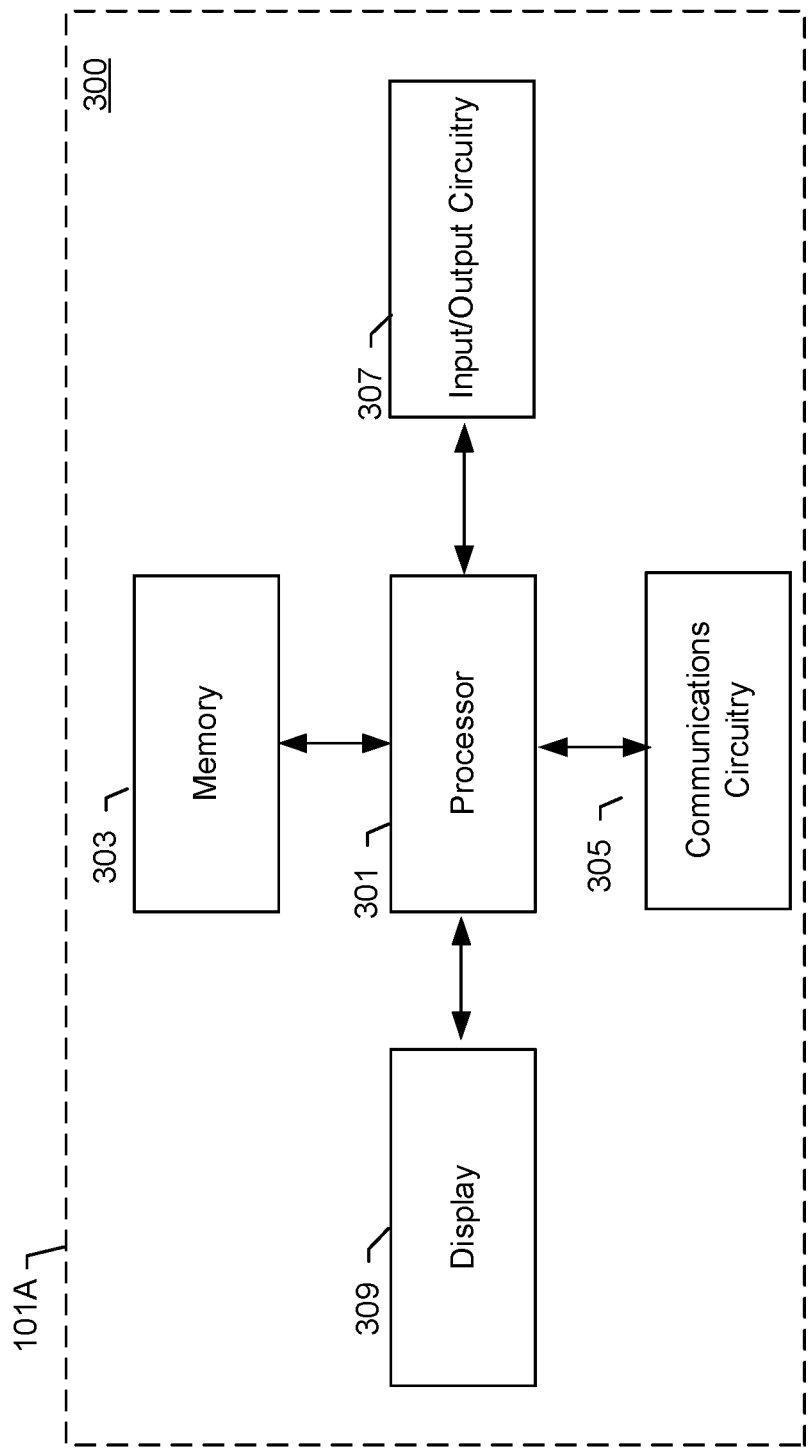
Figure 4:
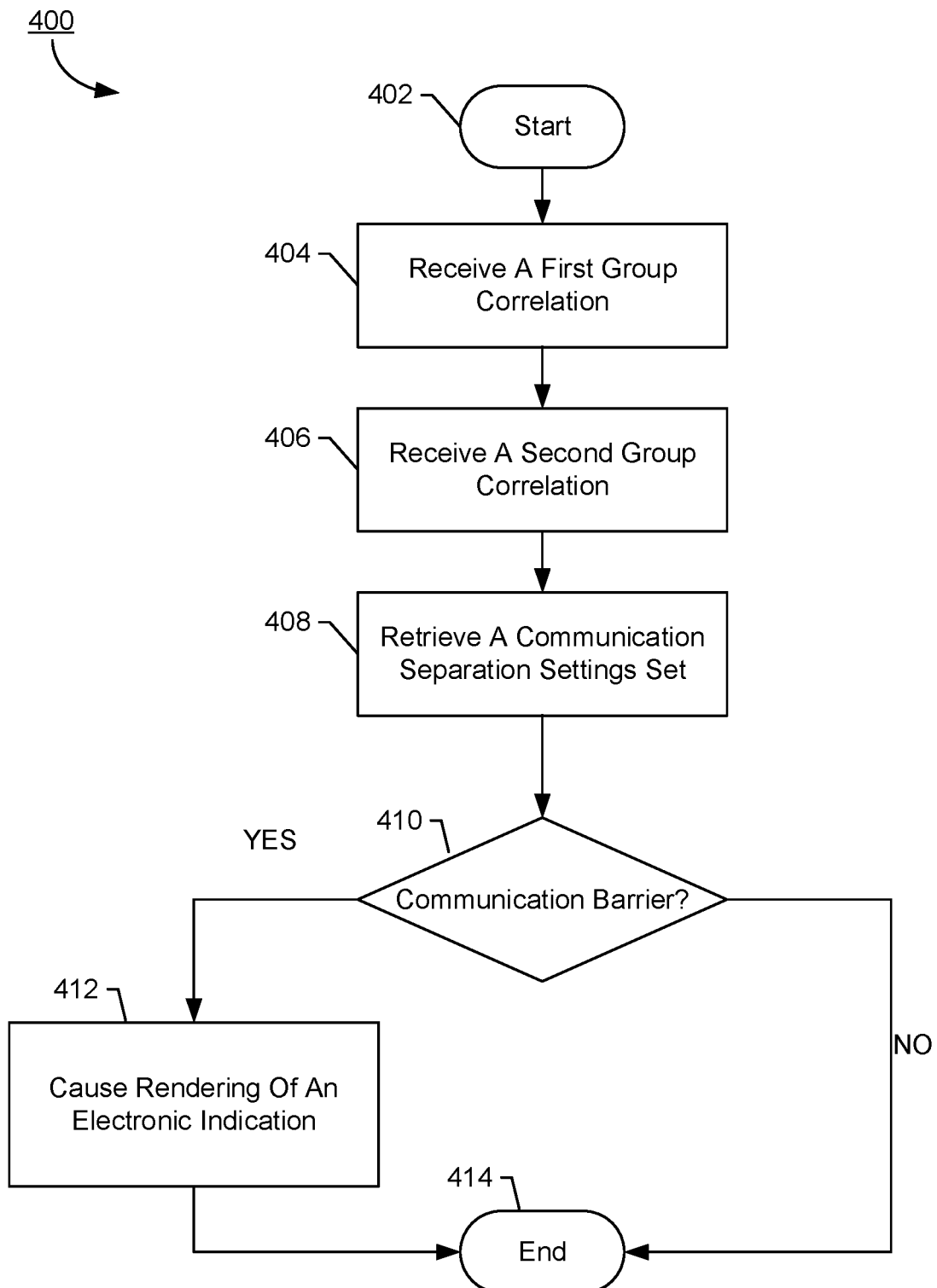
Figure 5:
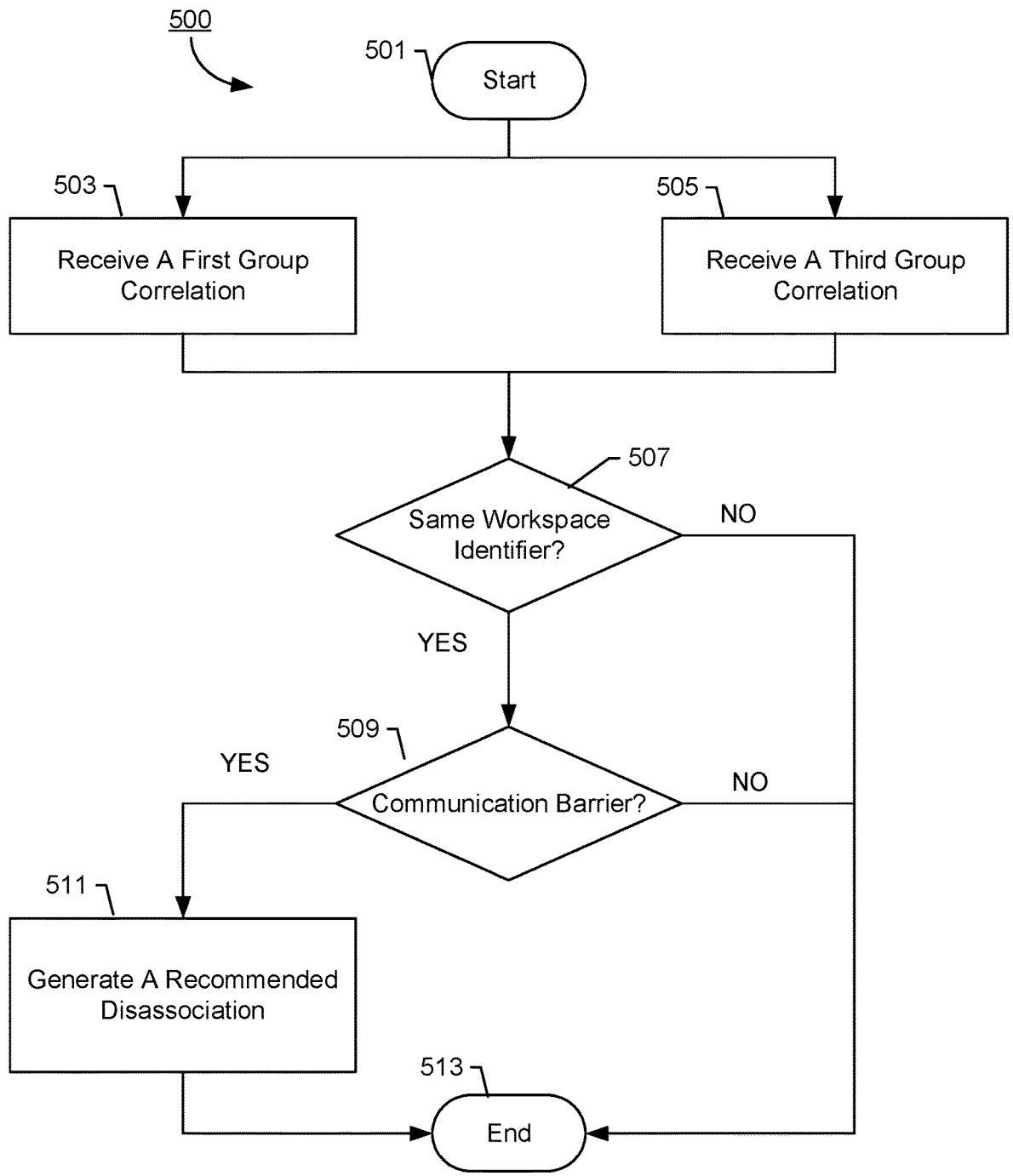
Figure 6:
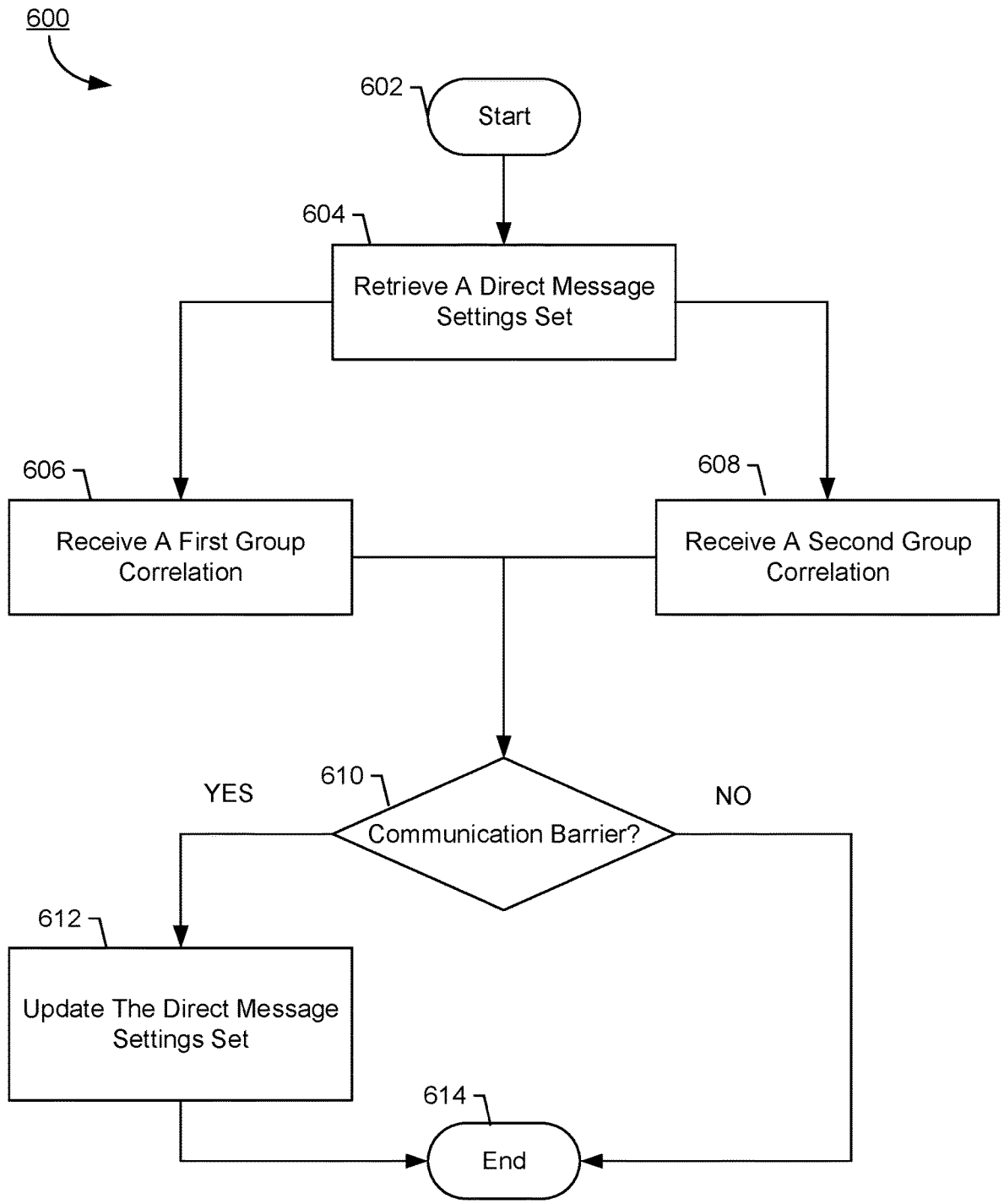
Figure 7:
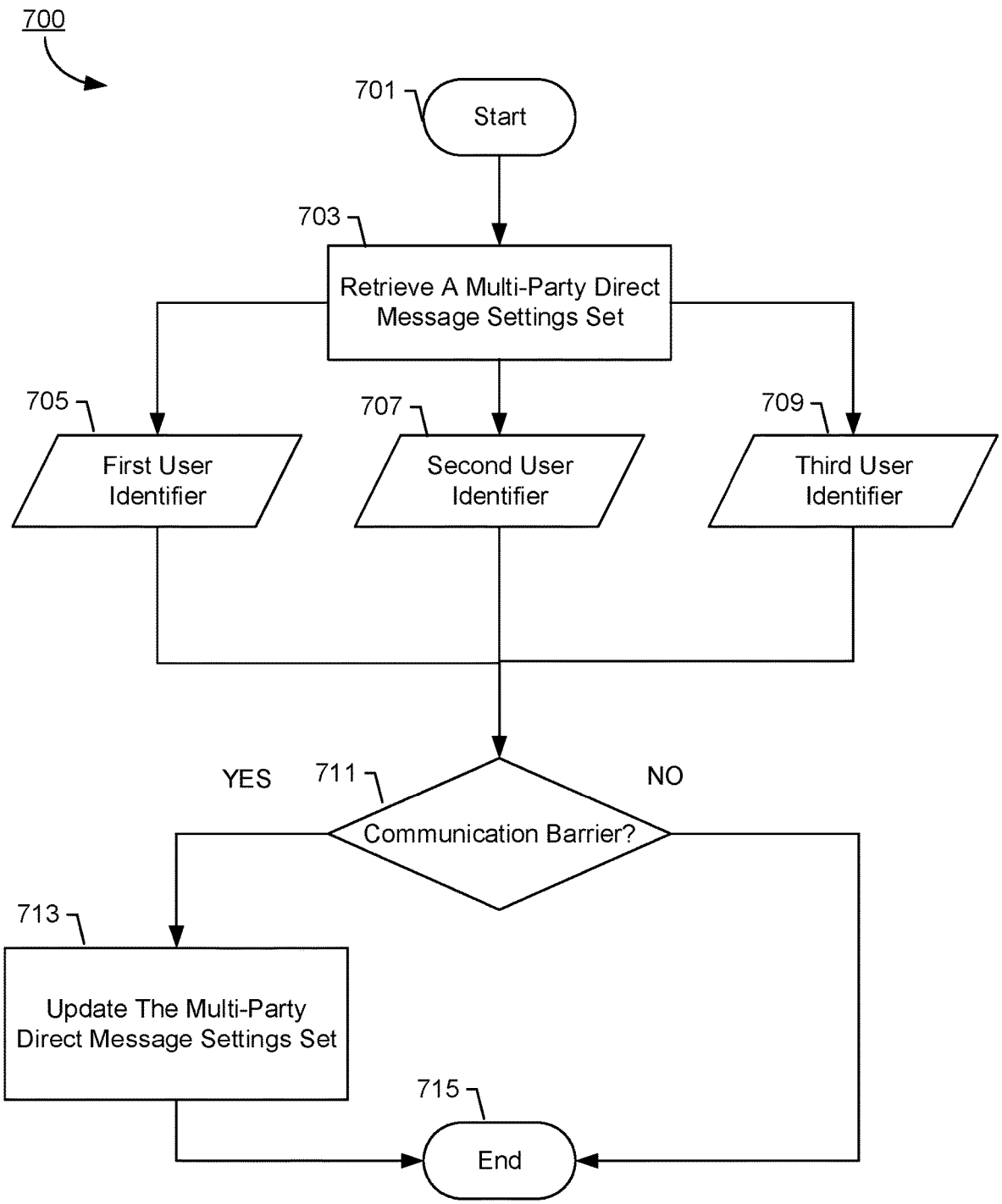
Figure 8:
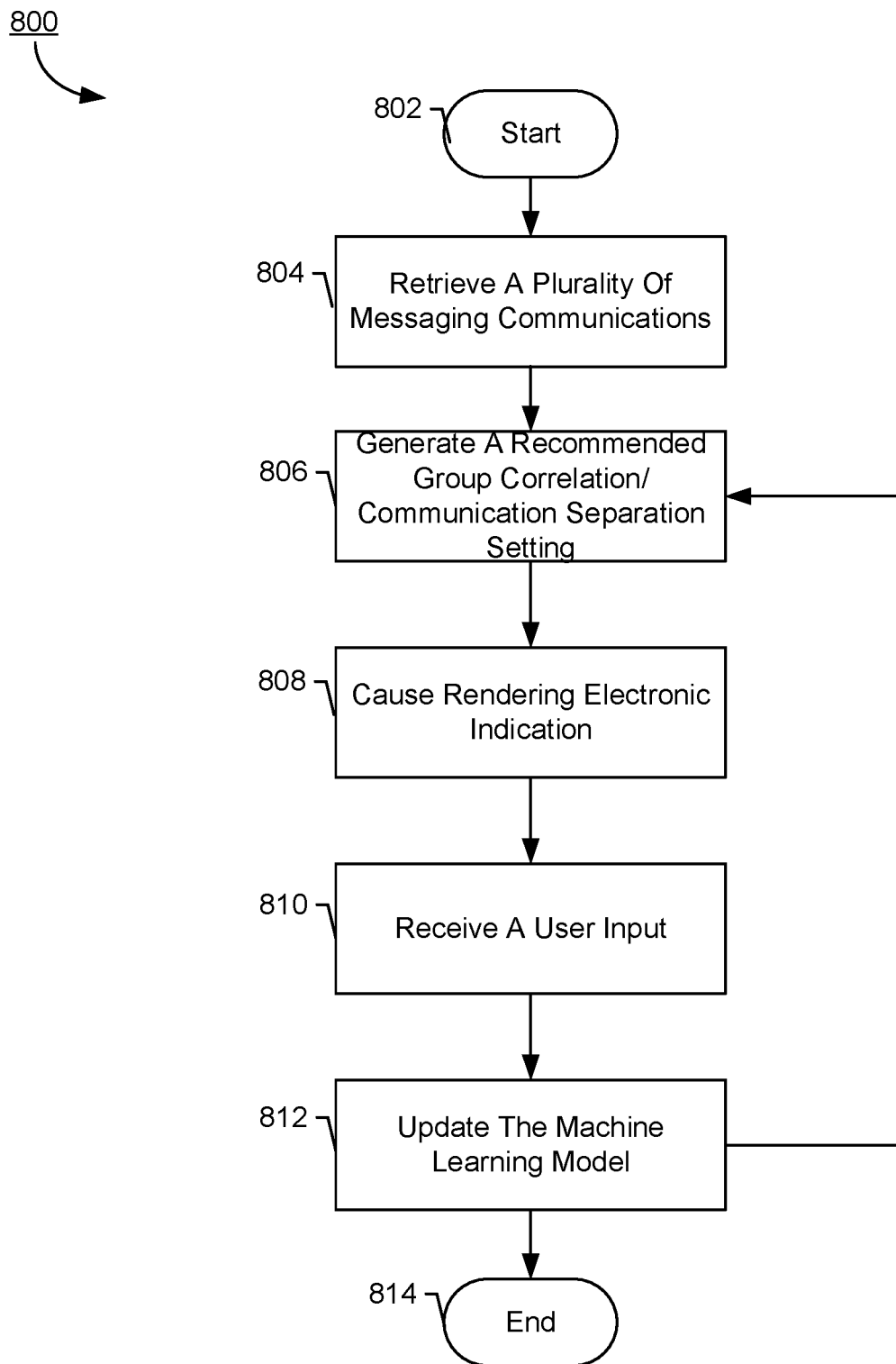
Figure 9:
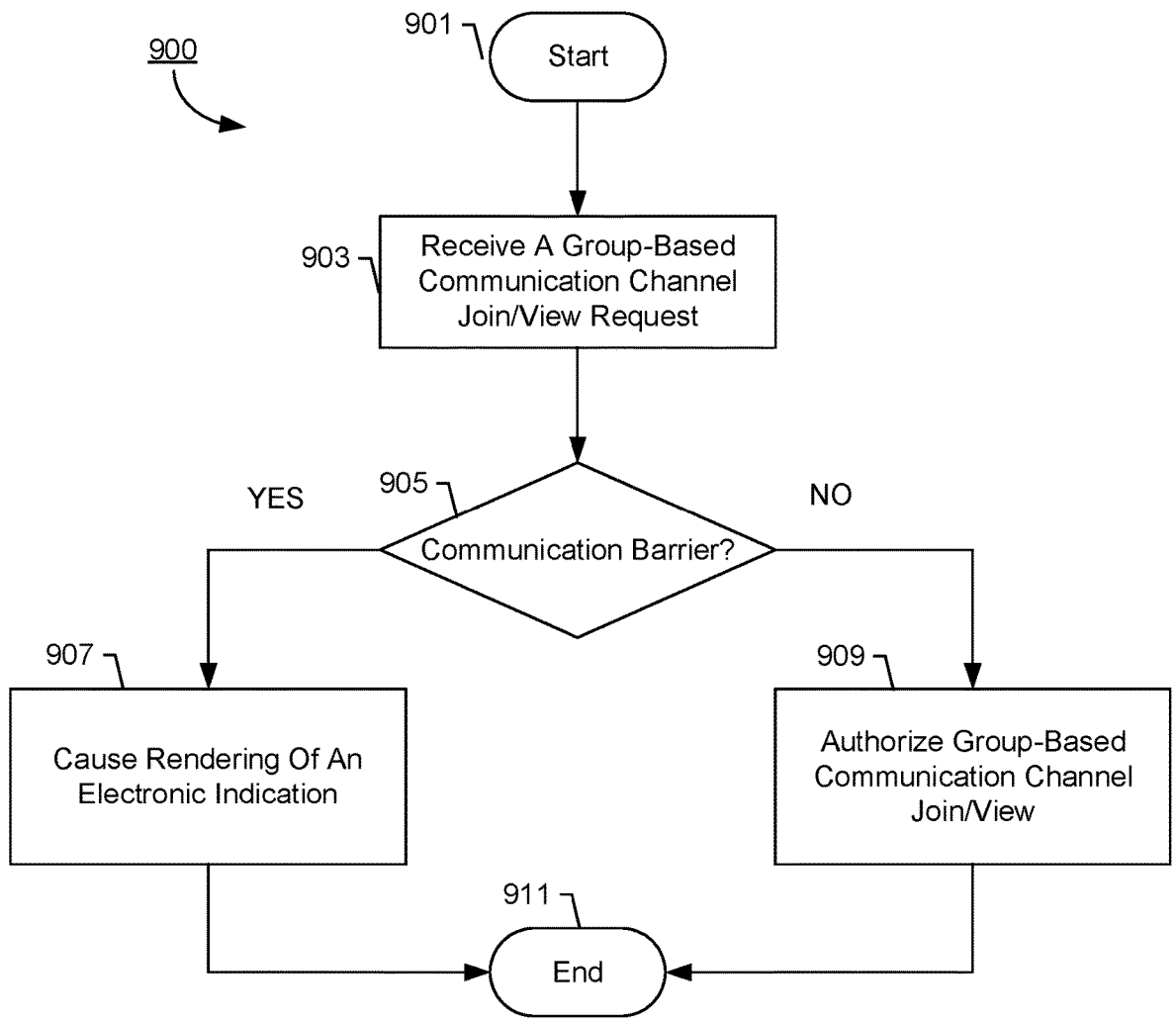
Figure 10:
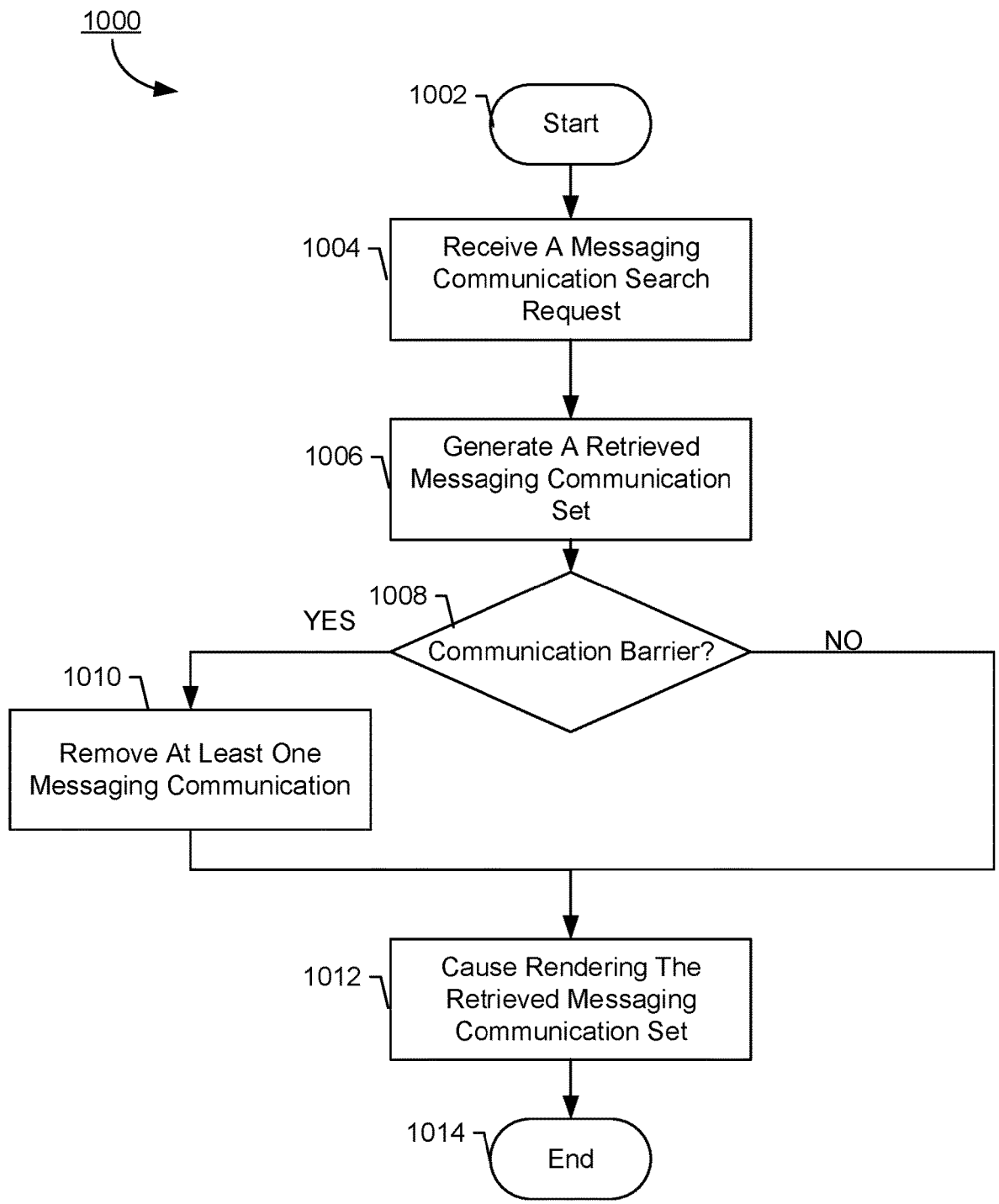
Figure 11:
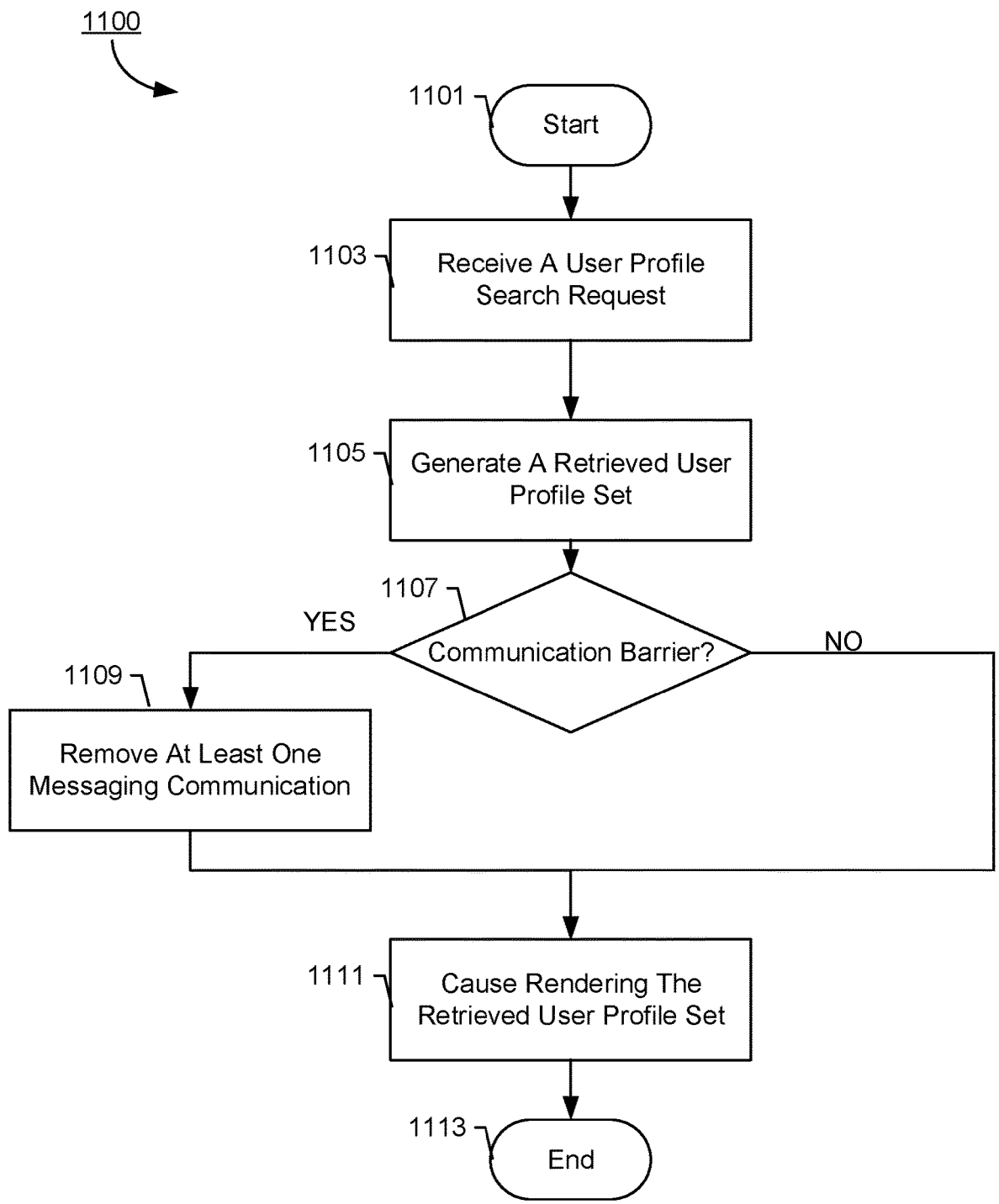
Figure 12:
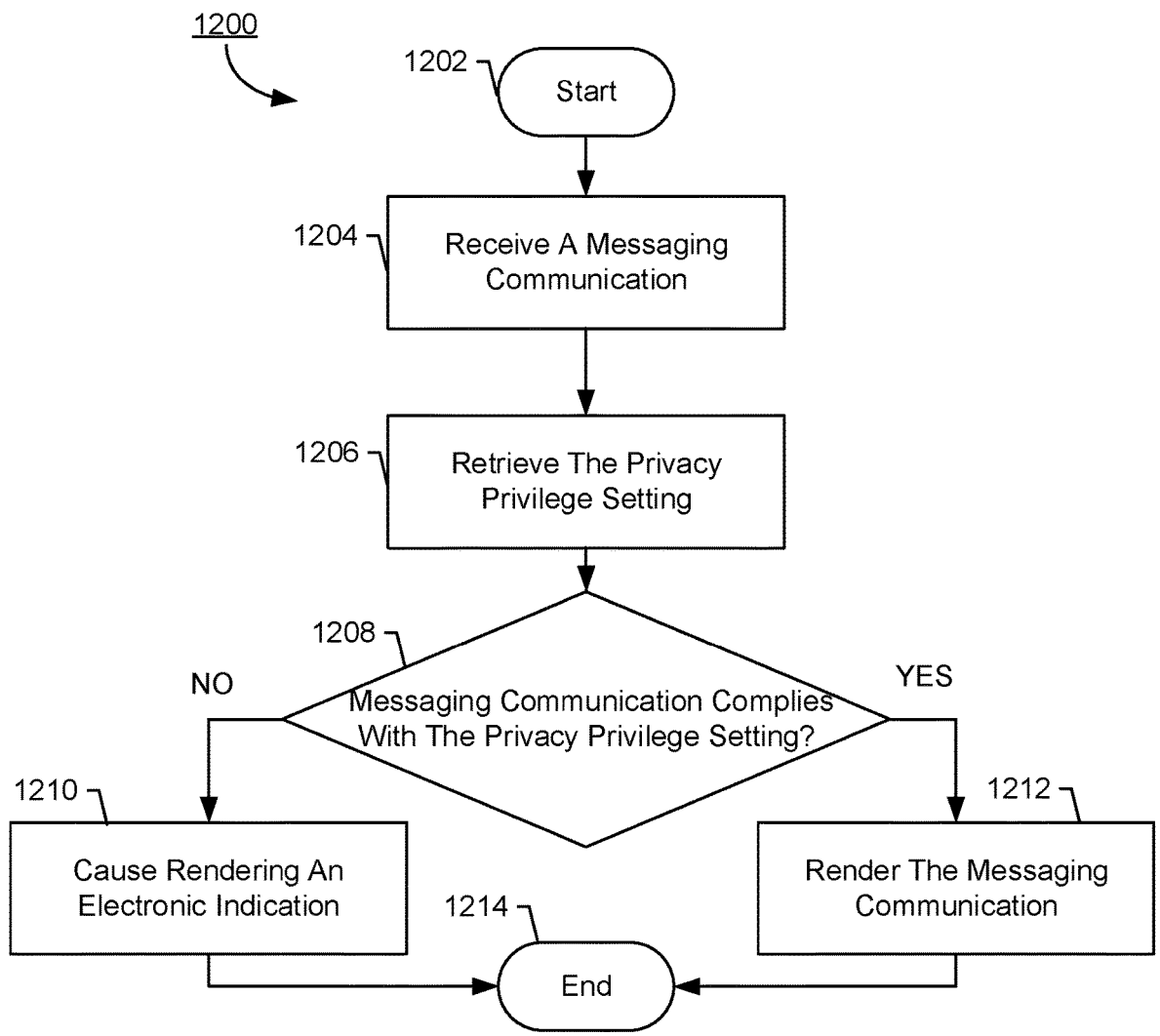

Having thus described some embodiments in general terms, references will now be made to the accompanying drawings, which are not necessarily drawn to scale, and wherein:

FIG. 1 is an example system architecture diagram illustrating an example group-based communication system in communication with other devices in accordance with some embodiments of the present disclosure;

FIG. 2 is an example infrastructure diagram illustrating an example apparatus in accordance with some embodiments of the present disclosure;

FIG. 3 is an example infrastructure diagram illustrating an example apparatus in accordance with some embodiments of the present disclosure;

FIG. 4 is an example flowchart illustrating an example method in accordance with some embodiments of the present disclosure;

FIG. 5 is an example flowchart illustrating an example method in accordance with some embodiments of the present disclosure;

FIG. 6 is an example flowchart illustrating an example method in accordance with some embodiments of the present disclosure;

FIG. 7 is an example flowchart illustrating an example method in accordance with some embodiments of the present disclosure;

FIG. 8 is an example flowchart illustrating an example method in accordance with some embodiments of the present disclosure;

FIG. 9 is an example flowchart illustrating an example method in accordance with some embodiments of the present disclosure;

FIG. 10 is an example flowchart illustrating an example method in accordance with some embodiments of the present disclosure;

FIG. 11 is an example flowchart illustrating an example method in accordance with some embodiments of the present disclosure; and FIG. 12 is an example flowchart illustrating an example method in accordance with some embodiments of the present disclosure.

DETAILED DESCRIPTION OF VARIOUS EMBODIMENTS

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," "in some examples," "for example," and the like generally mean that the particular feature, structure, or characteristic following the phrase may be included in an embodiment of the present disclosure, and may be included in more than one embodiment of the present disclosure (importantly, such phrases do not necessarily refer to the same embodiment).

Overview

Various embodiments of the present disclosure relate generally to communication separation in network systems. More specifically, various embodiments of the present disclosure are related to implementing communication barriers in a group-based communication system.

In the present disclosure, the term "communication barrier" (or "information barrier," "ethical wall") refers to processes that may restrict, limit, or prevent the flow of information/data from one user to another user. Technical challenges exist in implementing communication barriers in messaging platforms. For example, many messaging platforms fail to recognize the need for communication barrier, therefore causing unrestricted flows of information/data within the messaging platform and creating issues such as conflicts of interest and/or violations of law. As an example, when a messaging platform is implemented in the context of an investment bank with employees such as traders and investment bankers, there is a need to prevent traders from communicating with investment bankers to avoid any potential conflict of interest and violation of security law.

In addition, some messaging platforms may separate users from one another within the organization, and may create a separate communication rule for each user that may dictate who the user may communicate with. However, this approach may cause many issues. For example, when the user is switched to a different role/position that would require a new/different communication barrier, the communication rule associated with the user may need to be updated. When there is a large volume of changes within the organization, a large volume of rules may need to be updated, constraining the processing capability of these messaging platforms while delaying the handling of messaging communications in time.

Further, some messaging platforms fail to recognize different types of communications that may occur within the platform, and may inadvertently allow users to bypass communication barriers.

In contrast, systems structured in accordance with various embodiments of the disclosure provide specific, technical solutions to these technical problems. For example, various embodiments of the disclosure may dynamically categorize users into one or more groups, and may implement communication barriers based on groups, such that association between users and groups may be dynamically reconfigured when the need arises. In some examples, various embodiments of the disclosure may programmatically analyze data associated with a user to determine a suitable group for the user. In some examples, various embodiments of the disclosure may programmatically assess all types of communications within the system, such that bypassing of the communication barrier may be avoided. As a result, various embodiments of the present disclosure may improve data integrity and security in implementing communication barrier, while reducing network resource usage/processing capability constraint and mitigating compliance risks, details of which are described hereinafter.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

In the present disclosure, the term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like.

The term "group-based communication system" or "group-based communication platform" refers to a communications software platform and associated hardware that is configured to support and maintain a plurality of group-based communication interfaces and all associated functionality. Example group-based communication systems comprise supporting servers and client devices, as defined below.

The term "group-based communication server" refers to a software platform and associated hardware that is configured to manage access to the various group-based communication interfaces of the group-based communication system and provide various functionalities as described below. The group-based communication server is configured to access, maintain, and support application product logic of the group-based communication system and to access one or more data repositories such as a group-based communication repository.

The term "group-based communication repository" refers to a location where data is stored, accessed, modified and otherwise maintained by the group-based communication system. The stored data includes information that facilitates the operation of the group-based communication system, such as, but is not limited to, messaging communications associated with the group-based communication system, user identifications associated with the group-based communication system, and/or the like. The group-based communication repository may be embodied as a data storage device or devices, as a separate database server or servers, or as a combination of data storage devices and separate database servers. Further, in some embodiments, the group-based communication repository may be embodied as a distributed repository such that some of the stored data is stored centrally in a location within the group-based communication system and other data is stored in a single remote location or a plurality of remote locations. Alternatively, in some embodiments, the group-based communication repository may be distributed over a plurality of remote storage locations only.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "user" refers to an individual, group of individuals, business, organization, and the like. Users referred to herein are discussed largely in connection with client device enabled activity for accessing a group-based communication interface (or set of group-based communication interfaces) of a group-based communication system.

The term "user identifier" refers to an identifier that uniquely identifies information stored in a group-based communication system that is related to a user. For example, a user identifier may comprise American Standard Code for Information Interchange (ASCII) text, a pointer, a memory address, and the like. Information related to a user may be stored in a "user profile," "user account," or "user account details," as defined herein.

The terms "user profile," "user account," and "user account details" refer to data, files, and other information associated with a user, including, for example, a user identifier, one or more group-based communication channel identifiers (defined herein) associated with group-based communication channels that the user has been granted access to, one or more group identifiers (defined herein) for groups with which the user is associated, one or more workspace identifiers (defined herein) for workspaces with which the user is associated, an indication as to whether the user is an owner of any group-based communication channels, an indication as to whether the user has any group-based communication channel restrictions, a plurality of messages, a plurality of emojis, a plurality of reacjis associated with a user, a plurality of conversations, a plurality of conversation topics, a graphical representation, an email address, a real name (e.g., John Doe), a username (e.g., jdoe), a password, a time zone, an external resource user identifier, avatar rendering settings, and the like. The user account details can include a subset designation of user credentials, such as, for example, login information for the user including the user's username and password. Additional details of reacji are described in U.S. patent application Ser. No. 15/730,146, filed on Jul. 20, 2017, the entire content of which is incorporated by reference In some examples, users of a group-based communication system may be organized into groups. For example, employees within an organization may be organized into different groups, such that data exchange or communication between different groups may be prevented (for example, to prevent any potential conflict of interest). The group-based communication system may provide sufficient data security such that its system, channel, message, or virtual environment associated with a particular group of users is accessible only to that group of users, as described herein.

The terms "group identifier" or "team identifier" refer to one or more items of data by which a group within a group-based communication system may be uniquely identified. For example, a group identifier may comprise ASCII text, a pointer, a memory address, and the like. A group identifier may be used to facilitate access control for a message (e.g., access to the message, such as having the message return as part of search results in response to a search query, may be restricted to those users having the group identifier associated with their user profile), details of which are described herein. The group identifier may be used to determine context for the message (e.g., a description of the group, such as the name of an organization and/or a brief description of the organization, may be associated with the group identifier). For example, some group-based communication channels may be globally accessible to those users having one or more particular group identifiers associated with their user profile. Access to some group-based communication channels may be restricted to members of specified groups, whereby the group-based communication channels are accessible to those users having one or more particular group identifiers associated with their user profile.

The term "group correlation" refers to one or more items of data that may correlate or connect a user of the group-based communication system with a group of the group-based communication system. For example, a group correlation may comprise ASCII text, a pointer, a memory address, and the like, which may indicate that a particular user identifier is associated with one or more group identifiers.

The term "communication separation settings set" refers to one or more items of data that may indicate one or more computer generated and/or user-configured rules on whether one user and/or one group of users may communicate with another user and/or another group of users through the group-based communication system.

For example, a communication separation settings set may indicate rules on whether one group of users may have the communication privilege to receive communications from, transmit communications to, view communications associated with, and/or communicate with another group of users of the group-based communication system. For example, the communication separation settings set may comprise ASCII text, a pointer, a memory address, and the like, which may comprise a data field that may indicate a first group identifier, a data field that may indicate a second group identifier, and a data field that may indicate whether there is a "communication barrier" between users associated with the first group identifier and users associated with the second group identifier. The term "communication barrier" refers to one or more items of data indicating that users associated with a first group identifier is denied communication privilege to receive communications from, transmit communications to, view communications associated with, and/or communicate with users associated with a second group identifier through the group-based communication system.

Additionally, or alternatively, the communication separation settings set may comprise a data field indicating a user identifier and a data field indicating a "privacy privilege setting" associated with the user identifier. The term "privacy privilege setting" refers to one or more computer generated and/or user-configured rules on whether other users of the group-based communication system may have the communication privilege to communicate with the user associated with the user identifier through the group-based communication system. For example, a privacy privilege setting may comprise a "messaging communication protocol," which may define one or more computer generated and/or user-configured rules on whether users associated with certain workspaces may initiate messaging communication with the user associated with the user identifier, details of which are described herein.

Additionally, or alternatively, the communication separation settings set may be determined through a third-party identity provider. For example, a group-based communication platform may receive user identifications associated with users of the group-based communication platform from the third-party identity provider, and the group-based communication platform may determine communication barriers associated with these users based on the user identifications.

The terms "messaging communication," "electronic message," "message," "communication" refer to electronic content generated by a user using a client device and transmitted to a group-based communication server. Messaging communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication. Each messaging communication sent or posted to (i.e., transmitted for rendering within an interface of) a group-based communication server may include metadata comprising one or more of the following: a sending user identifier, a message identifier, message contents, a group identifier, and/or a group-based communication channel identifier. Each of the foregoing identifiers may comprise ASCII text, a pointer, a memory address, and the like.

In some examples, example messaging communications, electronic messages, messages and/or communications may be associated with a group-based communication channel. The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

In some examples, a group-based communication channel may be an "announcement channel," which may be configured to enable authenticated user account(s) permissioned as administrator(s) to configure posting privilege settings for one or more users associated with the announcement channel. For example, an administrator of an announcement channel may set the posting privilege to "everyone," such that each user of the announcement channel may post messaging communication to the announcement channel. As another example, an administrator of an announcement channel may set the posting privilege to "admins only," such that only administrator(s) of the announcement channel may post messaging communication to the announcement channel.

In some examples, each user may be associated with one or more group-based communication channels to which users may be assigned or which the users may join or view (e.g., group-based communication channels may represent departments, geographic locations such as offices, product lines, user interests, topics, issues, and/or the like). For example, users may request joining a group-based communication channel by, for example, transmitting a "group-based communication channel join request" to the group-based communication system. Users may request to view data associated with a group-based communication channel (e.g. messaging communications) by, for example, transmitting a "group-based communication channel view request" to the group-based communication system.

The terms "group-based communication channel identifier" or "channel identifier" refer to one or more items of data by which a group-based communication channel may be uniquely identified by a group-based communication system. For example, a group-based communication channel identifier may comprise ASCII text, a pointer, a memory address, and the like. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "group-based communication channel data" refers to data items associated with a group-based communication channel, including, but not limited to communications between, and files shared by, channel members of a group-based communication channel.

In some examples, example messaging communications, electronic messages, messages and/or communications may be in the form of a "direct message" or a "multi-party direct message." The term "direct message" refers to messaging communications between two users of the group-based communication system that are not posted on a group-based communication channel. The term "multi-party direct message" refers to messaging communications between more than two users of the group-based communication system that are not posted on a group-based communication channel.

The term "direct message settings set" refers to one or more items of data that may indicate one or more computer generated and/or user-configured rules that may control one or more characteristics associated with direct message functionalities between two users. For example, the direct message settings set may comprise rules that define whether two users may initiate direct messages with each other. Additionally, or alternatively, the direct message settings set may comprise rules that define whether past direct messages between the two users are read only or editable. Similarly, the term "multi-party direct message settings set" refers to one or more items of data that may indicate one or more computer generated and/or user-configured rules that may control one or more characteristics associated with multi-party direct message functionalities associated with more than two users. The term "direct message request" refers to one or more items of data that represent a request to initiate direct message functionalities between two users.

The terms "group-based communication workspace," "group-based workspace," "workspace data object," and "workspace" refer to electronically managed data including one or more of group-based communication channels (and their associated group-based communication channel data) and authenticated user accounts permissioned to access one or more of the group-based communication channels therein. In some examples, a workspace data object is configured to enable one or more authenticated user account(s) permissioned as administrator(s) to manage one or more functionalities of the workspace, for example to invite one or more authenticated user account(s) to access the workspace and/or terminate access rights to one or more authenticated user account(s) previously invited to the workspace.

In some examples, users of a group-based communication workspace may be associated with different group identifiers. For example, some users of a group-based communication workspace may be associated with a first group identifier, and other users of the same group-based communication workspace may be associated with a second group identifier.

The term "workspace identifier" refers to one or more identifiers by which a workspace within a group-based communication system may be uniquely identified. For example, a workspace identifier may comprise ASCII text, a pointer, a memory address, and the like. An organization or other entity within a group-based communication system may be associated with any number of workspace identifiers.

In some embodiments, a group-based communication channel may be associated with one or more workspace identifiers. A group-based communication channel associated with more than one workspace identifiers may be referred to as a "multi-workspace group-based communication channel." A multi-workspace group-based communication channel is accessible within these corresponding group-based workspaces.

The terms "organization data object" and "organization" refer to one or more data structures by which a set of group-based workspaces and/or group-based communication channels are associated with a particular entity. The term "organization identifier" refers to one or more items of data by which an organization may be uniquely identified. For example, an organization identifier may comprise ASCII text, a pointer, a memory address, and the like.

The term "group-based communication interface" refers to a virtual communications environment configured to facilitate user interaction with a group-based communications system. Each group-based communication interface is accessible and viewable to a select group of users, such as a group of employees of a business or organization. In some examples, the group-based communication interface comprises renderings of a plurality of group-based communication channels (e.g., a marketing channel, sales channel, accounting channel, etc.).

In some examples, a user using a client device may cause one or more "search requests" to be generated by the client device and transmitted to the group-based communication server. The term "search request" refers a data object that may indicate a request for data retrieval from one or more databases. For example, a "messaging communication search request" refers to an electronic request to retrieve one or more messaging communications associated with the group-based communication system. As another example, a "user profile search request" refers to an electronic request to retrieve one or more user profiles associated with group-based communication system. In some examples, a search request may comprise one or more search strings.

The term "set" refers to a collection of zero or more elements.

Example System Architecture for Implementing Embodiments of the Present Disclosure Methods, apparatuses, and computer program products of the present disclosure may be embodied by any of a variety of devices. For example, the method, apparatus, and computer program product of an example embodiment may be embodied by a networked device (e.g., a group-based communication system), such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example system architecture 100 within which embodiments of the present disclosure may operate. The system may comprise a repository (such as the group-based communication repository 107) and a server (such as a group-based communication server 109), details of which are described hereinafter.

Users may access a group-based communication system 105 via a communication network 103 using client devices 101A, 101B, . . . 101N. The client devices 101A-101N may be a computing device as defined herein. Electronic data received by the group-based communication system 105 from the client devices 101A-101N may be provided in various forms and via various methods. For example, the client devices 101A-101N may include desktop computers, laptop computers, smartphones, netbooks, tablet computers, wearables, and the like.

In embodiments where a client device of client devices 101A-101N is a mobile device, such as a smart phone or tablet, the client device may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location service circuitry, wired and wireless network interfaces, user contacts, and other applications.

Additionally, or alternatively, the client devices 101A-101N may interact with the group-based communication system 105 via a web browser or through a web application that runs in a web browser. As yet another example, the client devices OA-101N may include various hardware or firmware designed to interface with the group-based communication system 105.

The communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the communication network 103 may include an 802.11, 802.16, 802.20, and/or WiMax network. Further, the communication network 103 may include a public network (such as the Internet), a private network (such as an intranet), or combinations thereof, and may utilize a variety of networking protocols including, but not limited to, TCP/IP based networking protocols. For instance, the networking protocol may be customized to suit the needs of the group-based communication system 105. In some embodiments, the protocol is a custom protocol of JSON objects sent via a Websocket channel. In some embodiments, the protocol is JSON over RPC, JSON over REST/HTTP, and the like.

In various embodiments of the present disclosure, data and information (such as but not limited to, messaging communication, search queries, etc.) may be sent to the group-based communication system 105 via, for example, the communication network 103 directly by a client device of client devices 101A-101N. Additionally, or alternatively, these data and information (such as but not limited to, messaging communication, search queries, etc.) may be sent to the group-based communication system 105 via one or more intermediaries.

In one embodiment, one of the client devices 101A-101N may provide the following example messaging communication substantially in the form of a (Secure) Hypertext Transfer Protocol ("HTTP(S)") POST message including eXtensible Markup Language ("XML") formatted data, embodying a particular request for authenticating user account details to initiate an authenticated session, as provided below:

```
POST /authrequest.php HTTP/1.1
Host: www.server.com
Content-Type: Application/XML
Content-Length: 667
<?XML version = "1.0" encoding = "UTF-8"?>
<auth_request>
 <timestamp>2020-12-31 23:59:59</timestamp>
 <user_accounts_details>
    <user_account_credentials>
       <user_name>ID_user_1</user_name>
       <password>abc123</password>
       //OPTIONAL <cookie>cookieID</cookie>
       //OPTIONAL     <digital_cert_link>www.mydigitalcertificate.com/
JohnDoeDaDoeDoe@gmail.com/mycertifcate.dc</digital_cert_link>
       //OPTIONAL <digital_certificate>_DATA_</digital_certificate>
```

```
        </user_account_credentials>
    </user_accounts_details>
    <client_details> //iOS Client with App and Webkit
            //it should be noted that although several client details
            //sections are provided to show example variants of client
            //sources, further messages will include only one to save
            //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>nickname.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identifier>
        <channel_identifier>ID_channel_1</channel_identifier>
        <body contents>That is an interesting invention. I have attached a copy our patent
policy.</body contents>
        <attachments>patent_policy.pdf</attachments>
    </message>
</auth_request>
```

In the example shown in FIG. 1, the group-based communication system 105 may comprise a group-based communication server 109 and a group-based communication repository 107.

The group-based communication repository 107 may be embodied as a data storage device such as a Network Attached Storage (NAS) device or devices, or as a separate database server or servers. The group-based communication repository 107 comprises information accessed and stored by the group-based communication server 109 to facilitate the operations of the group-based communication system 105. For example, the group-based communication repository 107 may include, without limitation, a plurality of requests, invitations, communications, user identifiers, and the like organized within the group-based communication repository 107. For example, the group-based communication server 109 may provide electronic data relating to a user's interactions with the system, and the electronic data may be stored on the group-based communication repository 107. In some embodiments, the group-based communication repository 107 may be in communication with the group-based communication server 109 through the communication network 103. In some embodiments, the group-based communication repository 107 and the group-based communication server 109 may be contained in the group-based communication system 105.

In some embodiments, the group-based communication system 105 may be configured to include or be in communication with a user identification repository. The user identification repository may include identification data for one or more users. In some embodiments, the user identification repository may include user identifiers, channel identifiers, group identifiers, workspace identifiers, and the like. For example, the user identification repository may receive user profile information from the group-based communication server 109, and also receive additional identification data. In some embodiments, the user identification repository may be included in the same repository as the group-based communication repository 107.

In the example shown in FIG. 1, the group-based communication system 105 may comprise a group-based communication server 109 and a group-based communication repository 107.

The group-based communication repository 107 may be embodied as a data storage device such as a Network Attached Storage (NAS) device or devices, or as a separate database server or servers. The group-based communication repository 107 comprises information accessed and stored by the group-based communication server 109 to facilitate the operations of the group-based communication system 105. For example, the group-based communication repository 107 may include, without limitation, a plurality of requests, invitations, communications, user identifiers, external resource user identifiers, and the like organized within the group-based communication repository 107. For example, the group-based communication server 109 may provide electronic data relating to a user's interactions with the system, and the electronic data may be stored on the group-based communication repository 107. In some embodiments, the group-based communication repository 107 may be in communication with the group-based communication server 109 through the communication network 103. In some embodiments, the group-based communication repository 107 and the group-based communication server 109 may be contained in the group-based communication system 105.

In some embodiments, the group-based communication system 105 may be configured to include or be in communication with a user identification repository. The user identification repository may include identification data for one or more users. In some embodiments, the user identification repository may include user identifiers, channel identifiers, group identifiers, and the like. For example, the user identification repository may receive user profile information from the group-based communication server 109, and also receive additional identification data. In some embodiments, the user identification repository may be included in the same repository as the group-based communication repository 107.

In some examples, the group-based communication server 109 may create a storage message based upon the received message to facilitate message indexing and storage in a group-based communication repository 107. In some examples, the storage message may include one or more index objects described above. Additionally, or alternatively, the storage message may include data such as a message identifier, a group identifier, a group-based communication channel identifier, a sending user identifier, topics, responses, message contents, attachments, message hierarchy data, a thread identifier, third party metadata, conversation primitive data, and/or the like. For example, the group-based communication server 109 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>inventions</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting invention. I have attached a
copy our patent policy.</contents>
    <attachments>patent_policy.pdf</attachments>
    <conversation_primitive>
        conversation includes messages: ID_message_8,
ID_message_9, ID_message_10,
        ID_message_11, ID_message_12
    </conversation_primitive>
</storage_message>
```

In embodiments, a group-based communication channel identifier as defined above may be associated with the message. In embodiments, a sending user identifier as defined above may be associated with the message. In one implementation, the message may be parsed (e.g., using PUP commands) to determine a sending user identifier of the user who sent or posted the message to the group-based communication interface. In some embodiments, such sending user identifiers may correlate to target user identifiers in circumstances where an operating user is intending to view a series of messages posted by another user. Embodiments of the present invention would parse each message (e.g., using PUP commands) to identifier mentioned users (e.g., those @mentioned users) within the messages and those sending users as possible sources of target user identifiers for user identification queries as discussed in greater detail below.

Additionally, or alternatively, topics may be associated with the message. In one implementation, the message contents may be parsed (e.g., using PUP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

Additionally, or alternatively, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PUP commands) to determine the responses. In another implementation, data regarding responses to the message may be retrieved from a database. For example, data regarding responses to the message may be retrieved via a MySQL database command similar to the following:
SELECT messageResponses
FROM MSM_Message
WHERE messageID=ID_message_10.

For example, data regarding responses to the message may be used to determine context for the message (e.g., a social score for the message from the perspective of an operating user). In another example, data regarding responses to the message may be analyzed to determine context regarding the user (e.g., the user's expertise in a topic may be determined based on the responses to the user's message regarding the topic). Additionally, or alternatively, attachments may be included with the message. If there are attachments, files may be associated with the message. In one implementation, the message may be parsed (e.g., using PUP commands) to determine file names of the attachments. For example, file contents may be analyzed to determine context for the message (e.g., a patent policy document may indicate that the message is associated with the topic "patents"). Additionally, or alternatively, third party metadata may be associated with the message. For example, third party metadata may provide additional context regarding the message or the user that is specific to a company, group, group-based communication channel, and/or the like. In one implementation, the message may be parsed (e.g., using PUP commands) to determine third party metadata. Additionally, or alternatively, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the group-based communication channel) and/or proximity (e.g., message send order proximity, message send time proximity) of the messages. Additionally, or alternatively, various metadata, determined as described above, and/or the contents of the message may be used to index the message (e.g., using the conversation primitive) to facilitate various facets of searching (i.e., search queries that return results from group-based communication repository 107). In one implementation, a storage message may be sent from group-based communication server 109 to facilitate indexing in group-based communication repository 107. In another implementation, metadata associated with the message may be determined and the message may be indexed in group-based communication repository 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes). If there are attachments associated with the message, file contents of the associated files may be used to index such files in group-based communication repository 107 to facilitate searching. In one embodiment, the files may be indexed such that a company's or a group's files are indexed at a separate distributed repository.

It is noted that various components in the group-based communication server 109 may leverage the same computer or computing apparatus to perform various operations, and various components of the group-based communication repository 107 may leverage the same computer or computing apparatus to perform various operations.

Example Apparatus for Implementing Embodiments of the Present Disclosure

The group-based communication server 109 of FIG. 1 may be embodied by one or more computing systems, such as apparatus 200 shown in FIG. 2. The apparatus 200 may include a processor 202, a memory 204, an input/output circuitry 206, a communications circuitry 208, and a group-based communication circuitry 210. The apparatus 200 may be configured to execute the operations described above with respect to FIG. 1 and below with respect to FIGS. 4-12. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

The processor 202 may be embodied in a number of different ways and may, for example, include one or more processing devices configured to perform independently. In some examples, the processor 202 may include one or more processors configured in tandem via a bus to enable independent execution of instructions, pipelining, and/or multi-threading. The use of the term "processor" or "processing circuitry" may be understood to include a single core processor, a multi-core processor, multiple processors internal to the apparatus, and/or remote or "cloud" processors.

In some examples, the processor 202 may be configured to execute instructions stored in the memory 204 or otherwise accessible to the processor 202. In some examples, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include the input/output circuitry 206 that may, in turn, be in communication with the processor 202 to provide output to the user and, in some embodiments, to receive an indication of a user input. The input/output circuitry 206 may comprise a user interface circuitry and may include a display, which may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network (such as the communication network 103 as shown in FIG. 1). For example, the communications circuitry 208 may include one or more network interface cards, antennae, buses, switches, routers, modems, and supporting hardware and/or software, or any other device suitable for enabling communications via a network. Additionally, or alternatively, the communications circuitry 208 may include the circuitry for interacting with the antenna/antennae to cause transmission of signals via the antenna/antennae or to handle receipt of signals received via the antenna/antennae.

The group-based communication circuitry 210 includes hardware configured to support various functionalities of a group-based communication system, details of which are described hereinafter. The group-based communication circuitry 210 may utilize processing circuitry, such as the processor 202, to perform these actions. In some embodiments, the group-based communication circuitry 210 may include a separate processor, specially configured Field Programmable Gate Array (FPGA), or Application Specific Integrated Circuit (ASIC). The group-based communication circuitry 210 may be implemented using hardware components of the apparatus configured by either hardware or software for implementing the functions described herein.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like. As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

The client devices 101A-101N of FIG. 1 may include one or more computing systems, such as the apparatus 300 shown in FIG. 3. The apparatus 300 may include a processor 301, a memory 303, an input/output circuitry 307, a communications circuitry 305, an input/output circuitry 307, and/or a display 309. The apparatus 300 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries. The use of the term "circuitry" as used herein with respect to components of the apparatus should therefore be understood to include particular hardware configured to perform the functions associated with the particular circuitry as described herein.

As described above, the term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 300 may provide or supplement the functionality of particular circuitry. For example, the processor 301 may provide processing functionality, the memory 303 may provide storage functionality, the communications circuitry 305 may provide network interface functionality, and the like.

In some embodiments, the processor 301 (and/or coprocessor or any other processing circuitry assisting or otherwise associated with the processor) may be in communication with the memory 303 via a bus for passing information among components of the apparatus. The memory 303 may be non-transitory and may include, for example, one or more volatile and/or non-volatile memories. In other words, for example, the memory 303 may be an electronic storage device (e.g., a computer readable storage medium). The memory 303 may be configured to store information, data, content, applications, instructions, or the like, for enabling the apparatus 300 to carry out various functions in accordance with example embodiments of the present disclosure.

The processor 301 may be embodied in a number of different ways and may, for example, include one or more processing devices configured to perform independently. Additionally, or alternatively, the processor 301 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 301 may be configured to execute instructions stored in the memory 303 or otherwise accessible to the processor. Alternatively, or additionally, the processor 301 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor 301 is embodied as an executor of software instructions, the instructions may specifically configure the processor to perform the algorithms and/or operations described herein when the instructions are executed.

In some embodiments, the apparatus 300 may include the input/output circuitry 307 that may, in turn, be in communication with the processor 301 to provide output to the user and, in some embodiments, to receive an indication of a user input. The input/output circuitry 307 may comprise an interface, a mobile application, a kiosk, or the like. In some embodiments, the input/output circuitry 307 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory 303, and/or the like).

In some embodiments, the apparatus 300 may include the display 309 that may, in turn, be in communication with the processor 301 to display renderings of group-based communication interfaces. In various examples of the present disclosure, the display 309 may include a liquid crystal display (LCD), a light-emitting diode (LED) display, a plasma (PDP) display, a quantum dot (QLED) display, and/or the like.

The communications circuitry 305 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 305 may include, for example, a network interface for enabling communications with a wired or wireless communication network. For example, the communications circuitry 305 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Example Methods for Implementing Embodiments of the Present Disclosure

Various methods described herein, including, for example, example methods as shown in FIGS. 4-12, may improve data retrieval in a group-based communication system.

It is noted that each block of the flowchart, and combinations of blocks in the flowchart, may be implemented by various means such as hardware, firmware, circuitry and/or other devices associated with execution of software including one or more computer program instructions. For example, one or more of the procedures described in FIGS. 4-12 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Referring now to FIG. 4, an example method 400 is illustrated. In particular, the example method 400 illustrates examples of implementing at least one communication barrier in a group-based communication channel of a group-based communication platform.

The example method 400 may start at block 402. At block 404, a processing circuitry (such as the processor 202 of the group-based communication server 109 described above in connection with FIG. 1 and FIG. 2) may receive a first group correlation between a first user identifier and a first group identifier.

As described above, the term "group correlation" refers to one or more items of data that may correlate or connect a user of the group-based communication system with a group of the group-based communication system. For example, the first group correlation may indicate a first user (identified by the first user identifier) is part of a first user group (identified by the first group identifier).

In some examples, the processing circuitry may receive the first group correlation from a client device. For example, a user operating a client device (such as client devices 101A, 101B, . . . 101N described above in connection with FIG. 1) may transmit an electronic request to the group-based communication system, and the electronic request may identify a user identifier that needs to be associated or correlated with a corresponding group identifier. In some examples, the processing circuitry may programmatically determine one or more group correlations, details of which are described in connection with at least FIG. 8.

In some examples, the first user identifier may be associated with a first workspace identifier. As described above, the term "workspace" refers to electronically managed data that may include authenticated user accounts. For example, one or more users within the same department of an organization may join the same group-based communication workspace of the group-based communication system. In this example, user identifiers of these users may be associated with the same workspace identifier corresponding to the same group-based communication workspace. In examples where a user identifier of a user is associated with a workspace identifier, the user may access one or more data associated with the corresponding group-based communication workspace, including one or more group-based communication channels and their related group-based communication channel data.

In some examples, the first user identifier may be associated with a first group-based communication channel. The association between the first user identifier and the first group-based communication channel may indicate that the user is a member of the first group-based communication channel.

In some examples, the first group-based communication channel may be associated with the first workspace identifier and a second workspace identifier. As described above, the first group-based communication channel may be a "multi-workspace group-based communication channel." The first workspace identifier may identify a first group-based communication workspace, and the second workspace identifier may identifier a second group-based communication workspace. As an example, the first group-based communication workspace and the second group-based communication workspace may correspond to different departments (or teams) within an organization. In this example, the first group-based communication channel may enable members from different departments (or teams) to post messaging communication and exchange information between these different departments (or teams). In some examples, each of the first workspace identifier and the second workspace identifier may be associated with a plurality of group identifiers.

At block 406, a processing circuitry (such as the processor 202 of the group-based communication server 109 described above in connection with FIG. 1 and FIG. 2) may receive a second group correlation between a second user identifier and a second group identifier.

Similar to those described above in connection with block 404, the processing circuitry may receive the second group correlation from a client device, and/or may programmatically determine the second group correlation, details of which are described herein. The second group correlation may indicate a second user (identified by the second user identifier) is part of a second user group (identified by the second group identifier).

In some examples, the second user identifier may be associated with the first group-based communication channel, similar to those described above in connection with block 404. In some examples, both the first user identifier and the second user identifier may be associated with the same group-based communication channel. In such examples, the first user (identified by the first user identifier) and the second user (identified by the second user identifier) may both be members of the same group-based communication channel.

In some examples, the second user identifier may be associated with the second workspace identifier. As described above in connection with block 404, the first user identifier may be associated with the first workspace identifier different from the second workspace identifier. In such examples, the first user (identified by the first user identifier) and the second user (identified by the second user identifier) may be members of different departments (or teams).

At block 408, a processing circuitry (such as the processor 202 of the group-based communication server 109 described above in connection with FIG. 1 and FIG. 2) may retrieve a communication separation settings set associated with the first group identifier and the second group identifier.

As described above, the term "communication separation settings set" refers to one or more items of data that may indicate one or more computer generated and/or user-configured rules on whether one user and/or one group of users may communicate with another user and/or another group of users through the group-based communication system.

For example, the communication separation settings set may indicate that there is at least one communication barrier between the first group identifier and the second group identifier. In this example, the communication barrier may indicate that users associated with the first group identifier is denied communication privilege to receive communications from, transmit communications to, view communications associated with, and/or communicate with users associated with a second group identifier via the group-based communication system. For example, the processing circuitry may determine that there is conflict of interest between the first group of users and the second group of users that would prohibit them from communicating with one another.

Additionally, or alternatively, the communication separation settings set may indicate a plurality of communication barriers between the first group identifier and a plurality of group identifiers associated with the group-based communication platform. For example, the communication barriers may indicate that users associated with the first group identifier is denied communication privilege to receive communications from, transmit communications to, view communications associated with, and/or communicate with, for example, any other users of the group-based communication system.

Additionally, or alternatively, the communication separation settings set may comprise a privacy privilege setting, details of which are described in connection with at least FIG. 12.

At block 410, a processing circuitry (such as the processor 202 of the group-based communication server 109 described above in connection with FIG. 1 and FIG. 2) may determine whether there is a communication barrier associated with the first group identifier and the second group identifier.

If, at block 410, the processing circuitry determines that there is no communication barrier associated with the first group identifier and the second group identifier, the method 400 may proceed to block 414 and ends.

In some examples, the processing circuitry may determine that there is no communication barrier despite that the first user and the second user are associated with different group identifiers and different workspace identifiers. In such examples, the processing circuitry may cause rendering of the group-based communication channel with members having different group identifiers and/or different workspace identifiers.

If, at block 410, the processing circuitry determines that there is a communication barrier associated with the first group identifier and the second group identifier, the method 400 may proceed to block 412.

At block 412, a processing circuitry (such as the processor 202 of the group-based communication server 109 described above in connection with FIG. 1 and FIG. 2) may cause rendering, on a group-based communication interface, a first electronic indication associated with the first group-based communication channel based at least in part on the at least one communication barrier.

In some examples, the first electronic indication may indicate a recommended disassociation between the first group-based communication channel and the second workspace identifier. In some examples, the first electronic indication may be in the form of an electronic message. For example, the processing circuitry may cause rendering of an electronic message on the group-based communication interface that may indicate the first group-based communication channel is disassociated from the second workspace identifier. In this example, the processing circuitry may remove user identifiers associated with the second workspace identifier from the first group-based communication channel (including the second user identifier). As such, the remaining members of the first group-based communication channel may be only associated with the first workspace identifier, and the communication barrier of the communication separation settings set may be implemented.

Additionally, or alternatively, the first electronic indication may comprise an archived copy of messaging communications associated with the first group-based communication channel. In some examples, the processing circuitry may change posting privilege of the first group-based communication channel to read-only, such that members of the first group-based communication channel may no longer post messaging communications on the first group-based communication channel. In some examples, the processing circuitry may archive existing messaging communications in the first group-based communication channel by changing the viewing privilege to read-only, and render only an archived copy of these messaging communications for display on a group-based communication interface.

Additionally, or alternatively, the processing circuitry may remove rendering of the first group-based communication channel from the group-based communication interface, such that the first group-based communication channel is discontinued, and previous members of the first group-based communication channel may no longer communicate with one another through the first group-based communication channel.

The example method 400 may end at block 414.

Additionally, or alternatively, the processing circuitry may determine that the communication barrier is associated with one or more particular types of messaging communications (for example, texts, videos messages, and/or the like). When the processing circuitry receives a messaging communication between different groups of users, the processing circuitry may determine whether the type of the messaging communication is one of these associated with the communication barrier. If so, the messaging communication may be blocked. If not, the messaging communication may be allowed.

Referring now to FIG. 5, an example method 500 is illustrated. In particular, the example method 500 illustrates examples of implementing at least one communication barrier in a group-based communication workspace associated with a group-based communication platform.

The example method 500 may start at block 501. At block 503, a processing circuitry (such as the processor 202 of the group-based communication server 109 described above in connection with FIG. 1 and FIG. 2) may receive a first group correlation between a first user identifier and a first group identifier, similar to those described in connection with FIG. 4.

At block 505, a processing circuitry (such as the processor 202 of the group-based communication server 109 described above in connection with FIG. 1 and FIG. 2) may receive a third group correlation between a third user identifier and the second group identifier, similar to those described above in connection with FIG. 4.

At block 507, a processing circuitry (such as the processor 202 of the group-based communication server 109 described above in connection with FIG. 1 and FIG. 2) may determine whether both the first user identifier and the second user identifier are associated with the same workspace identifier.

In some examples, the processing circuitry may retrieve lists of authenticated user accounts associated with a plurality of group-based communication workspaces of the group-based communication system. In such examples, the lists may comprise user identifiers associated with each of the plurality of the group-based communication workspaces. The processing circuitry may compare the user identifiers (associated with each of the group-based communication workspaces) with the first user identifier and the second user identifier, and may determine whether both the first user identifier and the second user identifier are associated with the same workspace identifier.

If, at block 507, the processing circuitry determines that the first user identifier and the second user identifier are not associated with the same workspace identifier, the method 500 may proceed to block 513 and ends.

In some examples, the processing circuitry may determine that there is no communication barrier despite that the first user and the second user are associated with different group identifiers. In such examples, the processing circuitry may cause rendering of the group-based communication workspace with members having different group identifiers.

If, at block 507, the processing circuitry determines that both the first user identifier and the second user identifier are associated with the same workspace identifier, the method 500 may proceed to block 509.

At block 509, a processing circuitry (such as the processor 202 of the group-based communication server 109 described above in connection with FIG. 1 and FIG. 2) may determine whether there is a communication barrier between the first group identifier and the second group identifier.

As described above in connection with block 503 and block 505, the first user identifier may be associated with the first group identifier, and the third user identifier may be associated with the second group identifier. In some examples, the processing circuitry may retrieve a communication separation settings set associated with the first group identifier and the second group identifier, similar to those described above in connection with block 408 of FIG. 4. Based on the communication separation settings set, the processing circuitry may determine whether there is a communication barrier associated with the first group identifier and the second group identifier, similar to those described above in connection with block 410 of FIG. 4.

If, at block 509, the processing circuitry determines that there is no communication barrier associated with the first group identifier and the second group identifier, the method 500 may proceed to block 513 and ends.

If, at block 509, the processing circuitry determines that there is a communication barrier associated with the first group identifier and the second group identifier, the method 500 may proceed to block 511.

At block 511, a processing circuitry (such as the processor 202 of the group-based communication server 109 described above in connection with FIG. 1 and FIG. 2) may generate a recommended disassociation between the third user identifier and the first workspace identifier based at least in part on the at least one communication barrier between the first group identifier and the second group identifier.

In some examples, the processing circuitry may cause rendering, on the group-based communication interface, a second electronic indication associated with the third user identifier. For example, the second electronic indication may comprise a messaging communication indicating the recommended disassociation generated at block 511. Additionally, or alternatively, the second electronic indication may comprise a messaging communication indicating a recommended association between the third user identifier and the second workspace identifier.

The example method 500 may end at block 513.

Referring now to FIG. 6, an example method 600 is illustrated. In particular, the example method 600 illustrates examples of implementing at least one communication barrier associated with direct messages between users in a group-based communication platform.

The example method 600 may start at block 602. At block 604, a processing circuitry (such as the processor 202 of the group-based communication server 109 described above in connection with FIG. 1 and FIG. 2) may retrieve a direct message settings set related to a plurality of direct messages associated with the first user identifier and the second user identifier.

As described above, the term "direct message settings set" refers to one or more items of data that may indicate one or more computer generated and/or user-configured rules that may control one or more characteristics associated with direct message functionalities between two users. For example, the direct message settings set retrieved at block 602 may comprises rules on whether a first user identified by the first user identifier may be authorized to communicate messaging communication with a second user identified by the second user identifier through direct messages, and/or how these direct messages may be rendered for display on a group-based communication interface.

At block 606, a processing circuitry (such as the processor 202 of the group-based communication server 109 described above in connection with FIG. 1 and FIG. 2) may receive a first group correlation between a first user identifier and a first group identifier, similar to those described in connection with FIG. 4.

At block 608, a processing circuitry (such as the processor 202 of the group-based communication server 109 described above in connection with FIG. 1 and FIG. 2) may receive a second group correlation between a second user identifier and the second group identifier, similar to those described above in connection with FIG. 4.

At block 610, a processing circuitry (such as the processor 202 of the group-based communication server 109 described above in connection with FIG. 1 and FIG. 2) may determine whether there is a communication barrier between the first group identifier and the second group identifier.

As described above in connection with block 606 and block 608, the first user identifier may be associated with the first group identifier, and second user identifier may be associated with the second group identifier. In some examples, the processing circuitry may retrieve a communication separation settings set associated with the first group identifier and the second group identifier, similar to those described above in connection with block 408 of FIG. 4. Based on the communication separation settings set, the processing circuitry may determine whether there is a communication barrier associated with the first group identifier and the second group identifier, similar to those described above in connection with block 410 of FIG. 4.

At block 612, a processing circuitry (such as the processor 202 of the group-based communication server 109 described above in connection with FIG. 1 and FIG. 2) may update the direct message settings set.

For example, based at least in part on the at least one communication barrier between the first group identifier and the second group identifier, the processing circuitry may cause the direct message settings set to indicate that the plurality of direct messages (for example, all of the direct messages associated with these users) are read-only. In such an example, the processing circuitry may archive existing direct messages associated with the first user identifier and the second user identifier so that the first user and the second user may not change or edit these direct messages.

Additionally, or alternatively, the processing circuitry may cause rendering, on the group-based communication interface, a second electronic indication indicating a recommended disassociation between the second user identifier and the direct message settings set. For example, the processing circuitry may cause rendering of an electronic message indicating that the second user may no longer be authorized to communicate messaging communication with the first user through direct message due to the communication barrier.

Additionally, or alternatively, the processing circuitry may remove rendering of the direct messages from the group-based communication interface, such that users identified by the first user identifier and the second user identifier are no longer authorized to communicate messaging communication through direct messages.

The example method 600 may end at block 614.

Referring now to FIG. 7, an example method 700 is illustrated. In particular, the example method 700 illustrates examples of implementing at least one communication barrier associated with multi-party direct messages between users in a group-based communication platform.

The example method 700 may start at block 701. At block 703, a processing circuitry (such as the processor 202 of the group-based communication server 109 described above in connection with FIG. 1 and FIG. 2) may retrieve a multi-party direct message settings set related to a plurality of multi-party direct messages. In the example as shown in FIG. 7, the plurality of multi-party direct messages may be associated with a first user identifier 705, a second user identifier 707, and a third user identifier 709.

As described above, the term "multi-party direct message settings" refers to one or more items of data that may indicate one or more computer generated and/or user-configured rules that may control one or more characteristics associated with multi-party direct message functionalities associated with more than two users. For example, the multi-party direct message settings set retrieved at block 703 may comprises rules on whether a first user identified by the first user identifier 705, a second user identified by the second user identifier 707, and a third user identified by the third user identifier 709 are authorized to communicate messaging communication through multi-party direct messages with one another, and/or how these multi-party direct messages may be rendered for display on a group-based communication interface.

At block 711, a processing circuitry (such as the processor 202 of the group-based communication server 109 described above in connection with FIG. 1 and FIG. 2) may determine whether there is a communication barrier associated with group identifier(s) related to the first user identifier, the second user identifier, and the third user identifier.

For example, the processing circuitry may retrieve or receive one or more group correlations associated with the first user identifier, the second user identifier, and the third user identifier, similar to those described above in connection with block 404 and block 406 of FIG. 4. Based on the one or more group correlations, the processing circuitry may determine one or more group identifiers associated with the first user identifier, the second user identifier, and the third user identifier. In some examples, the processing circuitry may retrieve a communication separation settings set associated with group identifier(s) indicated in the group correlations, similar to those described above in connection with block 408 of FIG. 4. Based on the communication separation settings set, the processing circuitry may determine whether there is a communication barrier associated with the group identifier(s) related to the first user identifier, the second user identifier, and the third user identifier, similar to those described above in connection with block 410 of FIG. 4.

If, at block 711, the processing circuitry determines that there is no communication barrier associated with group identifier(s) related to the first user identifier, the second user identifier, and the third user identifier, the method 700 may proceed to block 715 and ends.

If, at block 711, the processing circuitry determines that there is a communication barrier associated with group identifier(s) related to the first user identifier, the second user identifier, and the third user identifier, the method 700 may proceed to block 713.

At block 713, a processing circuitry (such as the processor 202 of the group-based communication server 109 described above in connection with FIG. 1 and FIG. 2) may update the multi-party direct message settings set.

For example, based at least in part on the communication barrier, the processing circuitry may cause the multi-party direct message settings set to indicate that the plurality of multi-party direct messages (for example, all of the multi-party direct messages associated with these users) are read-only. In such an example, the processing circuitry may archive existing multi-party direct messages associated with the first user, the second user, and the third user so that they may not change or edit these multi-party direct messages.

Additionally, or alternatively, the processing circuitry may cause rendering, on the group-based communication interface, a second electronic indication indicating a recommended disassociation between one or more of the user identifiers and the multi-party direct message settings set. As an example, at block 711, the processing circuitry may determine that both the first user identifier and the third user identifier are associated with a first group identifier, and that the second user identifier is associated with second group identifier. In this example, the processing circuitry may generate a recommended disassociation between the second user identifier and the multi-party direct message settings set, such that the second user identifier may be removed from the multi-party direct messages, and the second user is no longer authorized to exchange messaging communications with the first user and the third user through multi-party direct messages. The processing circuitry may maintain the association of the multi-party direct message settings set with the first user identifier and the third user identifier, such that the first user and the third user may continue exchanging messaging communications through multi-party direct messages.

Additionally, or alternatively, the processing circuitry may remove rendering of the multi-party direct messages from the group-based communication interface, such that the first user, the second user, and the third user are no longer authorized to communicate messaging communication through multi-party direct messages.

The example method 700 may end at block 715.

While examples illustrated in FIG. 4, FIG. 6 and FIG. 8 are related to messaging communications in group-based communication channels, direct messages and multi-party direct messages, it is noted that the scope of the present discourse is not limited to these forms of messaging communications. In some examples, example embodiments of the present disclosure may implement one or more communication barriers in other forms of communications associated with the group-based communication system.

For example, example embodiments of the present disclosure may implement one or more communication barriers in messaging communications received from an external resource in communication with the group-based communication system. In the present disclosure, the term "external resource" refers to software program, application, platform, service, and/or associate hardware that may be configured to communicate with the group-based communication system for providing an external service (i.e., not native to the group-based communication system) to a client device via a group-based communication interface and/or to the group-based communication server. In some embodiments, the external resource may communicate with the group-based communication system, and vice versa, through one or more application programming interfaces (APIs). Example external resource may include, but is not limited to, third-party software plug-in (such as a bot).

In some examples, the external resource (authorized by a user) may provide messaging communication to a group-based communication channel, direct message, multi-party message on behalf on the user. In some examples, the processing circuitry may implement the at least one communication barrier with regards to communications received from the external resource, similar to those described herein. For example, the processing circuitry may determine a first user identifier associated with the messaging communication from an external resource (for example, based on the metadata associated with the messaging communication). The processing circuitry may determine one or more group correlations associated with the first user identifier, and may determine whether there is a communication barrier between the group identifier associated with the first user identifier and other group identifier(s) associated with user identifier(s) of the group-based communication channel, direct message, and/or multi-party message. Based on determining whether there is a communication barrier, the processing circuitry may cause rendering of one or more electronic indications, similar to those described herein.

Referring now to FIG. 8, an example method 800 is illustrated. In particular, the example method 800 illustrates examples of programmatically determining group correlation when implementing at least one communication barrier in a group-based communication platform.

The example method 800 may start at block 802. At block 804, a processing circuitry (such as the processor 202 of the group-based communication server 109 described above in connection with FIG. 1 and FIG. 2) may retrieve, from a group-based communication repository, a plurality of messaging communications associated with the first user identifier. For example, referring back to FIG. 1, the processing circuitry of the group-based communication server 109 may retrieve a plurality of messaging communications from the group-based communication repository 107 based on the first user identifier. For example, the processing circuitry may traverse messaging communications stored in the group-based communication repository based on whether metadata associated with the messaging communications may indicate the first user identifier.

In some examples, the processing circuitry may retrieve the plurality of messaging communications in response to an electronic request from a user operating a client device (such as a client device of client devices 101A-101N of FIG. 1). For example, the electronic request may indicate a request from a user to generate or update a group correlation associated with a user identifier.

In some examples, the processing circuitry may retrieve the plurality of messaging communications based on a predetermined time interval. For example, the processing circuitry may retrieve the plurality of messaging communications every 72 hours to determine whether a group correlation associated with the first user identifier should be revised or updated.

At block 806, a processing circuitry (such as the processor 202 of the group-based communication server 109 described above in connection with FIG. 1 and FIG. 2) may generate a recommended group correlation and/or a recommended communication separation setting for the first user identifier based at least in part on the plurality of messaging communications and a machine learning model.

In the present disclosure, the term "machine learning model" refers to one or more computer software algorithms and/or associated hardware apparatus that may perform one or more specific tasks through, for example but not limited to, pattern and/or interference recognition and without the need for explicit instructions. Example machine learning models may include, but not limited to, ensemble models, deep learning models, regression models, and/or the like.

In some examples, the processing circuitry may provide the messaging communications as input to the machine learning model. For example, the processing circuitry may implement a natural language processing (NLP) algorithm to perform topic modeling on the plurality of messaging communications. As an example, the processing circuitry may implement Latent Semantic Analysis (LSA) on the messaging communications to identify one or more keywords associated with these communications (e.g. "conflict"). Additionally, or alternatively, the NLP algorithm may perform named entity recognition, which may extract entities (such as user(s), group(s) of users, workspace(s), organization(s)) mentioned in the messaging communications.

While the above example illustrates using an NLP algorithm, it is noted that the scope of the present disclosure is not limited to NLP algorithm only. In some examples, other artificial intelligence models and/or machine learning may be implemented in addition to or in alternative of the NLP algorithm. Such examples may include, but not limited to, classification models (for example, but not limited to, logistic regression, decision tree, random forest, gradient-boosted tree, multilayer perceptron, one-vs-rest, and Naive Bayes).

For example, communication patterns may be determined by one or more of these machine learning models based on, for example, but not limited to, messages sent by a user and/or channels that a user is a part of. The communication patterns may be used to determine a corresponding group for the user (and the associated communication barriers), examples of which are described above.

Based on output of the machine learning model (for example, outputs from topic modeling and/or named entity recognition), the processing circuitry may identify one or more user(s) that may have potential conflict of interest with other user(s), and may generate recommended group correlation(s) and/or communication separation setting(s) so that users who may have conflict of interests may be associated with different group identifiers.

For example, outputs of the machine learning model may indicate that a first user associated with the first user identifier may have a conflict of interest with a second user associated with a second user identifier. In this example, the processing circuitry may generate a recommended group correlation associating the first user identifier with a first group identifier, and a recommended group correlation associating the second user identifier with a second group identifier. The processing circuitry may generate a communication separation setting indicating a communication barrier between the first group identifier and the second group identifier.

At block 808, a processing circuitry (such as the processor 202 of the group-based communication server 109 described above in connection with FIG. 1 and FIG. 2) may cause rendering, on the group-based communication interface, an electronic indication indicating the recommended group correlation and/or the recommended communication separation setting.

For example, the processing circuitry may cause rendering, on the group-based communication interface, an electronic message indicating that the first user identifier is recommended to be correlated with the recommended group identifier and/or an electronic message indicating the recommended communication separation setting associated with the first user identifier, as determined at block 806.

At block 810, a processing circuitry (such as the processor 202 of the group-based communication server 109 described above in connection with FIG. 1 and FIG. 2) may receive a user input in response to the electronic indication indicating the recommended group correlation.

For example, the user may be an administrator of the group-based communication system, and may provide input on whether the recommended group correlation and/or the communication separation setting is accurate and/or necessary. For example, the user input may indicate that the first user does not have a conflict of interest with other users of the group-based communication system, and therefore the recommended group correlation and/or the communication separation setting is not necessary.

At block 812, a processing circuitry (such as the processor 202 of the group-based communication server 109 described above in connection with FIG. 1 and FIG. 2) may update the machine learning model based at least in part on the user input.

For example, the processing circuitry may provide user input received at block 810 as a training set to train the machine learning model used at block 806 for generating a recommended group correlation and/or a recommend communication separation setting. For example, the processing circuitry may adjust one or more parameters associated with the machine learning model, such that outputs from the machine learning model may be in line with the user input received at block 810. By implementing this feedback loop, accuracy in generating recommend group correlation and/or communication separation setting may be improved.

While the above example in FIG. 8 illustrates the implementation of a machine learning model on messaging communications for generating a recommended group correlation/communication separation setting, it is noted that the scope of the present disclosure is not limited to using messaging communications as basis for generating the recommended group correlation/communication separation setting. Additionally, or alternatively, other data sources may be used to generate a recommended group correlation. For example, the processing circuitry may utilize data related to user identification and/or authentication of the group-based communication system that may be stored and managed by a third-party platform, and may generate one or more recommended group correlations and/or communication separation settings based on these data and/or one or more machine learning models.

The example method 800 may end at block 814.

Referring now to FIG. 9, an example method 900 is illustrated. In particular, the example method 900 illustrates examples of implementing at least one communication barrier in a group-based communication platform.

The example method 900 may start at block 901. At block 903, a processing circuitry (such as the processor 202 of the group-based communication server 109 described above in connection with FIG. 1 and FIG. 2) may receive a group-based communication channel join request and/or a group-based communication channel view request associated with a first user identifier and a group-based communication channel.

As described above, the group-based communication channel join request may be transmitted to the group-based communication system from a client device. The group-based communication channel join request may comprise a user identifier associated with the client device, as well as a channel identifier associated with the group-based communication channel that the user intends to join and become a member of. Similarly, the group-based communication channel view request may be transmitted to the group-based communication system from a client device. The group-based communication channel view request may comprise a user identifier associated with the client device, as well as a channel identifier associated with the group-based communication channel. The group-based communication channel view request may indicate that the user intends to view data/information (such as messaging communications) associated with the group-based communication channel.

In some examples, the group-based communication channel may be an announcement channel. As described above, administrators of the announcement channel may configure the posting privilege associated with the announcement channel. For example, the group-based communication channel join request or the group-based communication channel view request may be associated with an announcement channel where users of the announcement channel are only authorized to view messaging communications associated with the announcement channel and are not provided with posting privilege to post messaging communications to the announcement channel.

In some examples, the group-based communication channel may be a multi-workspace group-based communication channel as described above.

At block 905, a processing circuitry (such as the processor 202 of the group-based communication server 109 described above in connection with FIG. 1 and FIG. 2) may determine whether there is a communication barrier associated with group identifier(s) related to the first user identifier and the user identifiers associated with the group-based communication channel.

For example, the processing circuitry may retrieve or receive one or more group correlations associated with the first user identifier, similar to those described above in connection with block 404 and block 406 of FIG. 4. Based on the one or more group correlations, the processing circuitry may determine one or more group identifiers associated with the first user identifier.

The processing circuitry may retrieve a list of user identifiers associated with the group-based communication channel, which may indicate members of the group-based communication channel. Based on the list of user identifiers, the processing circuitry retrieve or receive one or more group correlations associated with these user identifiers, similar to those described above in connection with block 404 and block 406 of FIG. 4. Based on the one or more group correlations, the processing circuitry may determine one or more group identifiers associated with the group-based communication channel.

In some examples, the processing circuitry may retrieve a communication separation settings set associated with group identifier(s) related to the first user identifier and the user identifiers associated with the group-based communication channel, similar to those described above in connection with block 408 of FIG. 4. Based on the communication separation settings set, the processing circuitry may determine whether there is a communication barrier associated with the group identifier(s) related to the first user identifier and the user identifiers associated with the group-based communication channel, similar to those described above in connection with block 410 of FIG. 4.

As an example, the processing circuitry may receive a first group correlation between the first user identifier and a first group identifier. The processing circuitry may determine that a second user identifier is associated with the group-based communication channel, and may receive a second group correlation between the second user identifier and a second group identifier. At block 408, the processing circuitry may determine whether there is a communication barrier associated with the first group identifier and the second group identifier based on the communication separation settings set.

If, at block 905, the processing circuitry determines that there is a communication barrier associated with group identifier(s) related to the first user identifier and the user identifiers associated with the group-based communication channel, the method 900 may proceed to block 907.

At block 907, a processing circuitry (such as the processor 202 of the group-based communication server 109 described above in connection with FIG. 1 and FIG. 2) may cause rendering, on the group-based communication interface, an electronic indication based at least in part on the communication barrier.

In some examples, the processing circuitry may deny the group-based communication channel join/view request based on the communication barrier. For example, the electronic indication may comprise a messaging communication indicating that the user identified by the first user identifier is not authorized to join/view the group-based communication channel.

If, at block 905, the processing circuitry determines that there is no communication barrier associated with group identifier(s) related to the first user identifier and the user identifiers associated with the group-based communication channel, the method 900 may proceed to block 909.

At block 909, a processing circuitry (such as the processor 202 of the group-based communication server 109 described above in connection with FIG. 1 and FIG. 2) may authorize group-based communication channel join/view for the first user identifier in response to the group-based communication channel join/view request received at block 903. In some examples, the processing circuitry may cause rendering, on the group-based communication interface, an electronic indication indicating that the user identified by the first user identifier is authorized to join/view the group-based communication channel.

The example method 900 may end at block 911.

Referring now to FIG. 10, an example method 1000 is illustrated. In particular, the example method 1000 illustrates examples of implementing at least one communication barrier associated with messaging communication search request in a group-based communication platform.

The example method 1000 may start at block 1002. At block 1004, a processing circuitry (such as the processor 202 of the group-based communication server 109 described above in connection with FIG. 1 and FIG. 2) may receive a messaging communication search request comprising a search string from a user device associated with the first group identifier.

As described above, a "messaging communication search request" refers to an electronic request to retrieve one or more messaging communications associated with the group-based communication system. For example, the search string of the messaging communication search request may indicate one or more search terms for retrieving the one or more messaging communications.

In some examples, the messaging communication search request may be received from a user device associated with a first group identifier. For example, as described above, each client device may be associated with a user identifier that indicates the user operating the client device. Based on the user identifier, the processing circuitry may receive or retrieve one or more group correlations between the user identifier and one or more group identifiers, similar to those described above in connection with FIG. 4.

At block 1006, a processing circuitry (such as the processor 202 of the group-based communication server 109 described above in connection with FIG. 1 and FIG. 2) may generate a retrieved messaging communication set comprising a plurality of messaging communications.

In some examples, the processing circuitry may generate the retrieved messaging communication set based at least in part on the search string. The processing circuitry may traverse messaging communications associated with the group-based communication system (for example, messaging communication storied in the group-based communication repository 107 as described above in connection with FIG. 1).

For example, the processing circuitry may implement a sequential searching algorithm (such as linear search) and traverse messaging communications sequentially and determine whether any of these messaging communications comprises text that is the same as the search string. As another example, the processing circuitry may implement an interval searching algorithm (such as binary search) and traverse messaging communications by dividing the messaging communications into groups. The processing circuitry may generate the retrieved messaging communication set based on the results of traversing the messaging communications.

At block 1008, a processing circuitry (such as the processor 202 of the group-based communication server 109 described above in connection with FIG. 1 and FIG. 2) may determine whether there is a communication barrier between the first group identifier and group identifier(s) associated with the retrieved messaging communication set.

For example, the processing circuitry may determine one or more user identifiers associated with messaging communications in the retrieved messaging communication set based on, for example, metadata associated with the messaging communications as described above. The processing circuitry may retrieve or receive one or more group correlations associated with these one or more user identifiers, similar to those described above in connection with block 404 and block 406 of FIG. 4. Based on the one or more group correlations, the processing circuitry may determine one or more group identifiers associated with the retrieved messaging communication set.

In some examples, the processing circuitry may retrieve a communication separation settings set associated with the first group identifier and group identifier(s) associated with the retrieved messaging communication set, similar to those described above in connection with block 408 of FIG. 4. Based on the communication separation settings set, the processing circuitry may determine whether there is a communication barrier associated with the first group identifier and group identifier(s) associated with the retrieved messaging communication set, similar to those described above in connection with block 410 of FIG. 4.

As an example, the processing circuitry may determine that a sender of a messaging communication in the retrieved messaging communication set is associated with a second user identifier based on the metadata associated with the messaging communication. The processing circuitry may retrieve a group correlation between the second user identifier and a second group identifier. At block 1008, the processing circuitry may determine whether there is a communication barrier associated with the first group identifier and the second group identifier based on the communication separation settings set.

If, at block 1008, the processing circuitry determines that there is a communication barrier between the first group identifier and group identifier(s) associated with the retrieved messaging communication set based on the communication separation settings set, the method 1000 may proceed to block 1010.

At block 1010, a processing circuitry (such as the processor 202 of the group-based communication server 109 described above in connection with FIG. 1 and FIG. 2) may remove one or more messaging communications from the plurality of messaging communications in the retrieved messaging communication set based at least in part on the at least one communication barrier identified at block 1008.

Continuing from the above example, based on determining that there is a communication barrier associated with the first group identifier and the second group identifier, the processing circuitry may remove at least one messaging communication associated with the second group identifier from the plurality of messaging communications in the retrieved messaging communication set.

At block 1012, a processing circuitry (such as the processor 202 of the group-based communication server 109 described above in connection with FIG. 1 and FIG. 2) may cause rendering, in the group-based communication interface, the retrieved messaging communication set subsequent to removing the at least one messaging communication at block 1010.

Continuing from the above example, because messaging communication(s) associated with the second group identifier has been removed from the retrieved messaging communication set, the processing circuitry does not render messaging communication(s) associated with the second group identifier on the group-based communication interface. As such, the communication barrier identified at block 1008 is implemented when a user searches for messaging communications in the group-based communication system.

If, at block 1008, the processing circuitry determines that there is no communication barrier between the first group identifier and group identifier(s) associated with the retrieved messaging communication set, the method 1000 may proceed to block 1012. At block 1012, a processing circuitry (such as the processor 202 of the group-based communication server 109 described above in connection with FIG. 1 and FIG. 2) may cause rendering of the retrieved messaging communication set on a group-based communication interface.

The example method 1000 may end at block 1014.

Referring now to FIG. 11, an example method 1100 is illustrated. In particular, the example method 1100 illustrates examples of implementing at least one communication barrier associated with user profile search request in a group-based communication platform.

The example method 1100 may start at block 1101. At block 1103, a processing circuitry (such as the processor 202 of the group-based communication server 109 described above in connection with FIG. 1 and FIG. 2) may receive a user profile search request comprising a search string from a user device.

As described above, a "user profile search request" refers to an electronic request to retrieve one or more user profiles associated with the group-based communication system. For example, the search string of the user profile search request may indicate one or more search terms for retrieving the one or more user profiles.

In some examples, the messaging communication search request may be received from a user device associated with a first group identifier, similar to those described above in connection with block 1004 of FIG. 10.

At block 1105, a processing circuitry (such as the processor 202 of the group-based communication server 109 described above in connection with FIG. 1 and FIG. 2) may generate a retrieved user profile set comprising a plurality of user profiles.

In some examples, the processing circuitry may generate the retrieved user profile set based at least in part on the search string, similar to those described above in connection with block 1006 of FIG. 10

At block 1107, a processing circuitry (such as the processor 202 of the group-based communication server 109 described above in connection with FIG. 1 and FIG. 2) may determine whether there is a communication barrier between the first group identifier and group identifier(s) associated with the retrieved user profile set.

For example, the processing circuitry may determine a user identifier associated with each user profile in the retrieved user profile set. The processing circuitry may retrieve or receive one or more group correlations associated with these one or more user identifiers, similar to those described above in connection with block 404 and block 406 of FIG. 4. Based on the one or more group correlations, the processing circuitry may determine one or more group identifiers associated with the retrieved user profile set.

In some examples, the processing circuitry may retrieve a communication separation settings set associated with the first group identifier and group identifier(s) associated with the retrieved user profile set, similar to those described above in connection with block 408 of FIG. 4. Based on the communication separation settings set, the processing circuitry may determine whether there is a communication barrier associated with the first group identifier and group identifier(s) associated with the retrieved user profile set, similar to those described above in connection with block 410 of FIG. 4.

As an example, the processing circuitry may determine that a user profile in the retrieved user profile set is associated with a second user identifier. The processing circuitry may retrieve a group correlation between the second user identifier and a second group identifier. At block 1107, the processing circuitry may determine whether there is a communication barrier associated with the first group identifier and the second group identifier based on the communication separation settings set.

If, at block 1107, the processing circuitry determines that there is a communication barrier between the first group identifier and group identifier(s) associated with the retrieved user profile set based on the communication separation settings set, the method 1100 may proceed to block 1109.

At block 1109, a processing circuitry (such as the processor 202 of the group-based communication server 109 described above in connection with FIG. 1 and FIG. 2) may remove one or more user profiles from the plurality of user profiles in the retrieved user profile set based at least in part on the communication barrier identified at block 1107.

Continuing from the above example, based on determining that there is a communication barrier associated with the first group identifier and the second group identifier, the processing circuitry may remove one or more user profiles associated with the second group identifier from the plurality of user profiles in the retrieved user profile set.

At block 1111, a processing circuitry (such as the processor 202 of the group-based communication server 109 described above in connection with FIG. 1 and FIG. 2) may, cause rendering, in the group-based communication interface, the retrieved user profile set subsequent to removing the at least one user profile at block 1109.

Continuing from the above example, because user profile(s) associated with the second group identifier has been removed from the retrieved user profile set, the processing circuitry does not render user profile(s) associated with the second group identifier on the group-based communication interface. As such, the communication barrier identified at block 1107 is implemented when a user searches for user profiles in the group-based communication system.

If, at block 1107, the processing circuitry determines that there is no communication barrier between the first group identifier and group identifier(s) associated with the retrieved user profile set, the method 1100 may proceed to block 1113. At block 1113, a processing circuitry (such as the processor 202 of the group-based communication server 109 described above in connection with FIG. 1 and FIG. 2) may cause rendering of the retrieved user profile set on a group-based communication interface.

The example method 1100 may end at block 1113.

The example method 1100 may be implemented in associated with various organizations and/or contexts. For example, in the education context, if an educational company has users from different universities that may have access to the group-based communication platform, the example method 1100 may be implemented to make sure that one person can only be seen by other people associated with his or her university.

Referring now to FIG. 12, an example method 1200 is illustrated. In particular, the example method 1200 illustrates examples of implementing at least one communication barrier in the form of a privacy privilege setting in a group-based communication platform. For example, the communication separation settings set (as described above) may further indicate that a user identifier is associated with a privacy privilege setting.

The example method 1200 may start at block 1202. At block 1204, a processing circuitry (such as the processor 202 of the group-based communication server 109 described above in connection with FIG. 1 and FIG. 2) may receive a messaging communication from a second client device for a first client device.

In some examples, the second client device may be associated with a second user having a second user identifier, and the first client device may be associated with a first user having a first user identifier, similar to those described above. In some examples, the second user identifier may be associated with a second workspace identifier, and the first user identifier may be associated with a first workspace identifier, similar to those described above.

In some examples, the messaging communications may be in the form of a direct message. For example, a user operating the second client device may input a messaging communication to be sent as a direct message to the first user of the first client device. In some examples, the messaging communication may be in the form of a messaging communication to be posted on a group-based communication channel. For example, the messaging communication may contain a text string that refers to the first user of the first client device (e.g. the messaging communication may contain an "@" symbol followed by the user name associated with the user operating the first client device.

At block 1206, a processing circuitry (such as the processor 202 of the group-based communication server 109 described above in connection with FIG. 1 and FIG. 2) may retrieve a privacy privilege setting based on, for example, the first user identifier associated with the first client device.

As described above, the term "privacy privilege setting" refers to one or more computer generated and/or user-configured rules on whether other users of the group-based communication system may have the communication privilege to communicate with the user associated with the user identifier through the group-based communication system.

For example, the privacy privilege setting may indicate that all other users of the group-based communication system may initiate messaging communication with the first user associated with the first user identifier. As another example, the privacy privilege setting may indicate that only users associated with one or more particular workspaces (for example, based on the workspace identifier) may initiate messaging communication with the first user associated with the first user identifier. As another example, the privacy privilege setting may indicate that users who are not associated with the same workspace identifier as the first user may not initiate messaging communication with the first user. As another example, the privacy privilege setting may indicate that other users of the group-based communication system may transmit electronic requests to the first user for initiating messaging communications with the user, and may only initiate messaging communication with the first user when the first user provides input approving the electronic requests.

For example, referring to the example above where the messaging communication may contain an "@" symbol followed by the user name of a user associated with a privacy privilege setting, the processing circuitry may determine that the privacy privilege setting may indicate that other users cannot initiate messaging communications with the user unless the user approves an electronic request to initiate said messaging communication.

In some examples, the privacy privilege setting may be determined based on user inputs. For example, users of the group-based communication system may provide one or more user inputs to the group-based communication system indicating the corresponding privacy privilege setting associated with the corresponding user identifier.

In some examples, one or more administrators of the group-based communication system may determine the privacy privilege setting for each user. As described above, a group-based communication workspace may be configured to enable one or more authenticated user account(s) permissioned as administrators to manage one or more functionalities of the workspace, and these administrators may configure and/or modify privacy privilege settings associated with users of the workspace.

At block 1208, a processing circuitry (such as the processor 202 of the group-based communication server 109 described above in connection with FIG. 1 and FIG. 2) may determine whether the messaging communication received at block 1204 complies with the privacy privilege setting retrieved at block 1206.

As described above, the privacy privilege setting may comprise a "messaging communication protocol," which may define one or more computer generated and/or user-configured rules on whether users associated with certain workspaces may initiate messaging communication with the user associated with the user identifier. In some examples, a messaging communication protocol may be associated with the first workspace identifier and the second workspace identifier.

For example, the privacy privilege setting may indicate that all other users of the group-based communication system may initiate messaging communication with the user associated with the first user identifier. As such, the messaging communication protocol may indicate that users associated with any workspace identifier may initiate messaging communication with the first user, and the processing circuitry may determine that the messaging communication received at block 1204 complies with the privacy privilege setting retrieved at block 1206.

As another example, the privacy privilege setting may indicate that only users associated with one or more particular workspaces (for example, based on the workspace identifier) may initiate messaging communication with the first user associated with the first user identifier. The messaging communication protocol may comprise a list of approved workspace identifiers. The processing circuitry may only provide communication privilege to users associated with a workspace identifier on the list of approved workspace identifiers to initiate messaging communication with the first user, and may not provide communication privilege to users associated with a workspace identifier that is not on the list of approved workspace identifiers. For example, the processing circuitry may determine that the messaging communication received at block 1204 complies with the privacy privilege setting retrieved at block 1206 if the second workspace identifier is on the list of approved workspace identifiers. The processing circuitry may determine that the messaging communication received at block 1204 does not comply with the privacy privilege setting retrieved at block 1206 if the second workspace identifier is not on the list of approved workspace identifiers.

As another example, the privacy privilege setting may indicate that users who are not associated with the same workspace identifier as the first user may not initiate messaging communication with the user. For example, the processing circuitry may determine that the messaging communication received at block 1204 complies with the privacy privilege setting retrieved at block 1206 if the second user identifier is associated with the same workspace identifier as the first user identifier. The processing circuitry may determine that the messaging communication received at block 1204 does not comply with the privacy privilege setting retrieved at block 1206 if the second user identifier is not associated with the same workspace identifier as the first user identifier.

As another example, the privacy privilege setting may indicate that other users of the group-based communication system may transmit electronic requests to the first user for initiating messaging communications with the first user, and may only initiate messaging communication with the first user when the first user provides input approving the electronic requests, example details are described in connection with block 1210.

If, at block 1208, the processing circuitry determines that the messaging communication received at block 1204 does not comply with the privacy privilege setting, the method 1200 may proceed to block 1210.

At block 1210, a processing circuitry (such as the processor 202 of the group-based communication server 109 described above in connection with FIG. 1 and FIG. 2) may cause rendering an electronic indication on the group-based communication interface based at least in part on the messaging communication protocol.

In some examples, the electronic indication may comprise an electronic message indicating that the messaging communication is not in compliance with the messaging communication protocol.

In some examples, the electronic indication may comprise a messaging communication request to be sent to the first client device. In such examples, after the processing circuitry receives user input from the first client device approving the messaging communication request, the processing circuitry may provide communication privilege to the second user for initiating messaging communication with the first user.

If, at block 1208, the processing circuitry determines that the messaging communication received at block 1204 complies with the privacy privilege setting, the method 1200 may proceed to block 1212. At block 1212, a processing circuitry (such as the processor 202 of the group-based communication server 109 described above in connection with FIG. 1 and FIG. 2) may cause rendering of the messaging communication received at block 1204.

The example method 1200 may end at block 1214.

Additional Implementation Details

Although example processing systems have been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. A computer-readable storage medium can be, or be included in, a computer-readable storage device, a computer-readable storage substrate, a random or serial access memory array or device, or a combination of one or more of them. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random-access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer needs not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., an LCD monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML (Hypertext Markup Language) page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. A method implemented at least in part by a group-based communication system, the method comprising:
   receiving, from a first client device of a first user of the group-based communication system, a first message associated with a communication channel of the group-based communication system, wherein the communication channel is associated with a plurality of users including the first user, and wherein the first user is associated with a user identifier;
   in response to receiving the first message, causing the first message to be presented via a channel-based messaging user interface in association with the communication channel, wherein the channel-based messaging user interface is presented via at least a second client device of a second user of the plurality of users; and
   denying a communication privilege of the second user based at least in part on a privacy setting, wherein denying the communication privilege prohibits the second user from initiating, in response to the first message, a second message associated with the user identifier and transmitting the second message to the first client device.

2. The method of claim 1, wherein the second message comprises a messaging communication to be presented via the channel-based messaging user interface in association with the communication channel, wherein the first user is referenced in the second message.

3. The method of claim 1, wherein the second message comprises a direct message to the first user.

4. The method of claim 1, further comprising accessing the privacy setting based at least in part on the user identifier, and in response to receiving the first message.

5. The method of claim 1, wherein the communication channel is associated with at least two group identifiers, and wherein the first user is associated with a first group identifier and the second user is associated with a second group identifier, and wherein the privacy setting restricts communication from other users associated with the second group identifier.

6. The method of claim 1, wherein the privacy setting indicates that incoming communications associated with the user identifier require approval prior to being transmitted to the first client device, the method further comprising:
   receiving, from the second client device, the second message, wherein the second message is associated with at least one of the first message or the user identifier;
   sending, to the first client device, a request for approval to receive the second message;
   receiving, from the first client device, an indication that the request is denied; and
   denying the communication privilege based at least in part on receiving the indication.

7. The method of claim 1, wherein the privacy setting is associated with one or more identifiers that are approved for communicating with the first user, the method further comprising:
   determining that an identifier associated with the second user is absent from the one or more identifiers; and
   denying the communication privilege based at least in part on a determination that the identifier associated with the second user is absent from the one or more identifiers.

8. The method of claim 1, wherein prohibiting the transmitting of the second message to the first client device comprises refraining from sending the second message to the first client device or refraining from publishing the second message via the communication channel.

9. The method of claim 1, further comprising causing an indication to be presented via an instance of the channel-based messaging user interface, wherein the indication indicates that the second message violates the privacy setting.

10. A system comprising:
    one or more processors; and one or more computer-readable media storing instructions that, when executed by the one or more processors, cause the system to perform operations comprising:
    storing a privacy setting associated with a communication privilege of a second user of a group-based communication system for communicating with a first user of the group-based communication system, wherein the privacy setting permits the second user to view communications transmitted by the first user via a channel-based messaging user interface in association with a communication channel communication of the group-based communication system and restricts the second user from communicating with the first user; and
    denying the communication privilege of the other second user based at least in part on the privacy setting, wherein denying the communication privilege prohibits the other second user from at least one of initiating a message associated with a user identifier of the first user and transmitting the message to a client device associated with the user identifier.

11. The system as claim 10 recites, wherein the message comprises (i) a messaging communication to be presented via the channel-based messaging user interface in association with a communication channel, wherein the first user is referenced in the message, or (ii) a direct message to the first user.

12. The system as claim 10 recites, the operations further comprising:
    receiving the message, wherein the message is associated with the user identifier; and
    in response to receiving the message, accessing the privacy setting based at least in part on the user identifier.

13. The system as claim 12 recites, wherein the privacy setting indicates that incoming communications associated with the user identifier require approval prior to being transmitted to the client device or being presented via an instance of a group-based messaging user interface, the operations further comprising:
    sending, to the client device, a request for approval to receive the message; and
    receiving, from the client device, an indication that the request is denied, wherein denying the communication privilege is further based at least in part on receiving the indication.

14. The system of claim 12, wherein the privacy setting is associated with one or more identifiers that are approved for communicating with the first user, the operations further comprising:
    determining that an identifier associated with the message is absent from the one or more identifiers; and
    denying the communication privilege further based at least in part on a determination that the identifier associated with the message is absent from the one or more identifiers.

15. The system of claim 14, wherein the identifier associated with the message comprises one or more of an identifier associated with a sender of the message or a group identifier associated with a group with which the sender is associated.

16. The system of claim 12, wherein the client device comprises a first client device, and the operations further comprising causing an indication to be presented via an instance of a group-based messaging user interface presented via a second client device associated with a sender of the message, wherein the indication indicates that the message violates the privacy setting.

17. One or more non-transitory computer-readable media storing instructions that, when executed by one or more processors, cause the one or more processors to perform operations comprising:

storing a privacy setting associated with a communication privilege of a second user for communicating with a first user of a group-based communication system;

causing a first message from a first client device of the first user to be presented via a channel-based messaging user interface of a second client device of the second user in association with a communication channel communication;

receiving, from the second client device, a second message associated with a user identifier of the first user;

determining that the second message does not comply with the privacy setting; and based at least in part on a determination that the second message does not comply with the privacy setting, denying the communication privilege associated with the second message.

18. The one or more non-transitory computer-readable media of claim 17, wherein the privacy setting permits the first user to transmit communications via the group-based communication system and prohibits the second user of the group-based communication system from sending communications to the first user.

19. The one or more non-transitory computer-readable media of claim 17, wherein the second message comprises (i) a messaging communication to be presented via the channel-based messaging user interface in association with a communication channel, wherein the first user is referenced in the message, or (ii) a direct message to the first user.

20. The one or more non-transitory computer-readable media of claim 17, wherein the privacy setting indicates:

(i) that incoming communications associated with the user identifier require approval prior to being transmitted to the first client device or presented via an instance of a group-based messaging user interface presented via the first client device; or (ii) one or more identifiers that are approved for communicating with the first user.

* * * * *